(12) United States Patent
Sayem

(10) Patent No.: US 12,736,923 B2
(45) Date of Patent: Sep. 15, 2026

(54) WATCH WITH BIPLANAR SLOT ANTENNA CONFIGURATION

(71) Applicant: Garmin International, Inc., Olathe, KS (US)

(72) Inventor: Abu T. Sayem, Olathe, KS (US)

(73) Assignee: Garmin International, Inc., Olathe, KS (US)

(*) Notice: Subject to any disclaimer, the term of this patent is extended or adjusted under 35 U.S.C. 154(b) by 122 days.

(21) Appl. No.: 18/766,313

(22) Filed: Jul. 8, 2024

(65) Prior Publication Data

US 2025/0167434 A1 May 22, 2025

Related U.S. Application Data

(60) Provisional application No. 63/597,967, filed on Nov. 10, 2023.

(51) Int. Cl.

| | |
|---|---|
| ***G04G 17/04*** | (2006.01) |
| ***G01S 19/36*** | (2010.01) |
| ***G04G 21/04*** | (2013.01) |
| ***H01Q 1/27*** | (2006.01) |
| ***H01Q 1/48*** | (2006.01) |
| ***H01Q 5/20*** | (2015.01) |
| ***H01Q 5/30*** | (2015.01) |
| ***H01Q 13/10*** | (2006.01) |
| ***H01Q 13/18*** | (2006.01) |

(52) U.S. Cl.

CPC .............. *G04G 17/04* (2013.01); *G01S 19/36* (2013.01); *G04G 21/04* (2013.01); *H01Q 1/273* (2013.01); *H01Q 1/48* (2013.01); *H01Q 5/20* (2015.01); *H01Q 5/30* (2015.01); *H01Q 13/10* (2013.01); *H01Q 13/18* (2013.01)

(58) Field of Classification Search

None

See application file for complete search history.

(56) References Cited

U.S. PATENT DOCUMENTS

| | | |
|---|---|---|
| 7,271,774 B2 | 9/2007 | Puuri |
| 9,647,338 B2 | 5/2017 | Nissinen et al. |

(Continued)

OTHER PUBLICATIONS

Pending U.S. Appl. No. 18/766,330, filed Jul. 8, 2024.

(Continued)

*Primary Examiner* — Dameon E Levi
*Assistant Examiner* — Anh Ho
(74) *Attorney, Agent, or Firm* — Samuel M. Korte; Max M. Ali; Kathleen D. Fitterling

(57) ABSTRACT

An electronic device comprises a housing, a printed circuit board, a first slot antenna, and a second slot antenna. The housing includes a side wall, a bezel coupled to the side wall, and a bottom plate coupled to the side wall. The printed circuit board is positioned within the housing between the bezel and the bottom plate, and at least partially forms a ground plane. The first slot antenna transmits and/or receives a first wireless signal having a first frequency and is formed in part by a first portion of a circumference of the bezel, and the ground plane of the printed circuit board. The second slot antenna transmits and/or receives a second wireless signal having a second frequency and is formed in part by a first portion of a circumference of the bottom plate, and the ground plane of the printed circuit board.

20 Claims, 20 Drawing Sheets

(56) References Cited

U.S. PATENT DOCUMENTS

| | | | |
|---|---|---|---|
| 10,079,428 | B2 | 9/2018 | Nissinen et al. |
| 10,271,299 | B1 | 4/2019 | Sayem et al. |
| 10,276,925 | B2 | 4/2019 | Han et al. |
| 10,484,958 | B2 | 11/2019 | Sayem et al. |
| 10,581,145 | B2 | 3/2020 | Han et al. |
| 10,594,025 | B2 | 3/2020 | Nissinen et al. |
| 10,734,731 | B2 | 8/2020 | Sepänniitty et al. |
| 10,944,158 | B2 | 3/2021 | Sayem et al. |
| 10,971,805 | B2 | 4/2021 | Kenkel et al. |
| 11,018,432 | B2 | 5/2021 | Varjonen et al. |
| 11,271,291 | B2 | 3/2022 | Hanshew et al. |
| 11,329,365 | B2 * | 5/2022 | Liu ........................ H01Q 1/273 |
| 11,460,587 | B2 | 10/2022 | Sayem et al. |
| 11,569,572 | B2 | 1/2023 | Kulkarni et al. |
| 11,592,577 | B2 | 2/2023 | Sayem et al. |
| 11,853,015 | B2 | 12/2023 | Atmatzakis et al. |
| 11,990,673 | B2 | 5/2024 | Sayem et al. |
| 12,244,060 | B2 | 3/2025 | Sayem et al. |
| 12,422,787 | B2 | 9/2025 | Sayem et al. |
| 2017/0358850 | A1 * | 12/2017 | Vanjani ................. G06F 1/1656 |
| 2019/0198984 | A1 * | 6/2019 | Han ....................... H04B 1/385 |
| 2019/0245271 | A1 * | 8/2019 | Varjonen .................. H01Q 1/42 |
| 2024/0113430 | A1 * | 4/2024 | Ji ........................... H01Q 9/045 |
| 2025/0076825 | A1 | 3/2025 | Russell et al. |

OTHER PUBLICATIONS

Pending U.S. Appl. No. 19/202,371, filed May 8, 2025.
Pending U.S. Appl. No. 19/202,376, filed May 8, 2025.
Pending U.S. Appl. No. 19/302,816, filed Aug. 18, 2025.

* cited by examiner

Figure 14B:
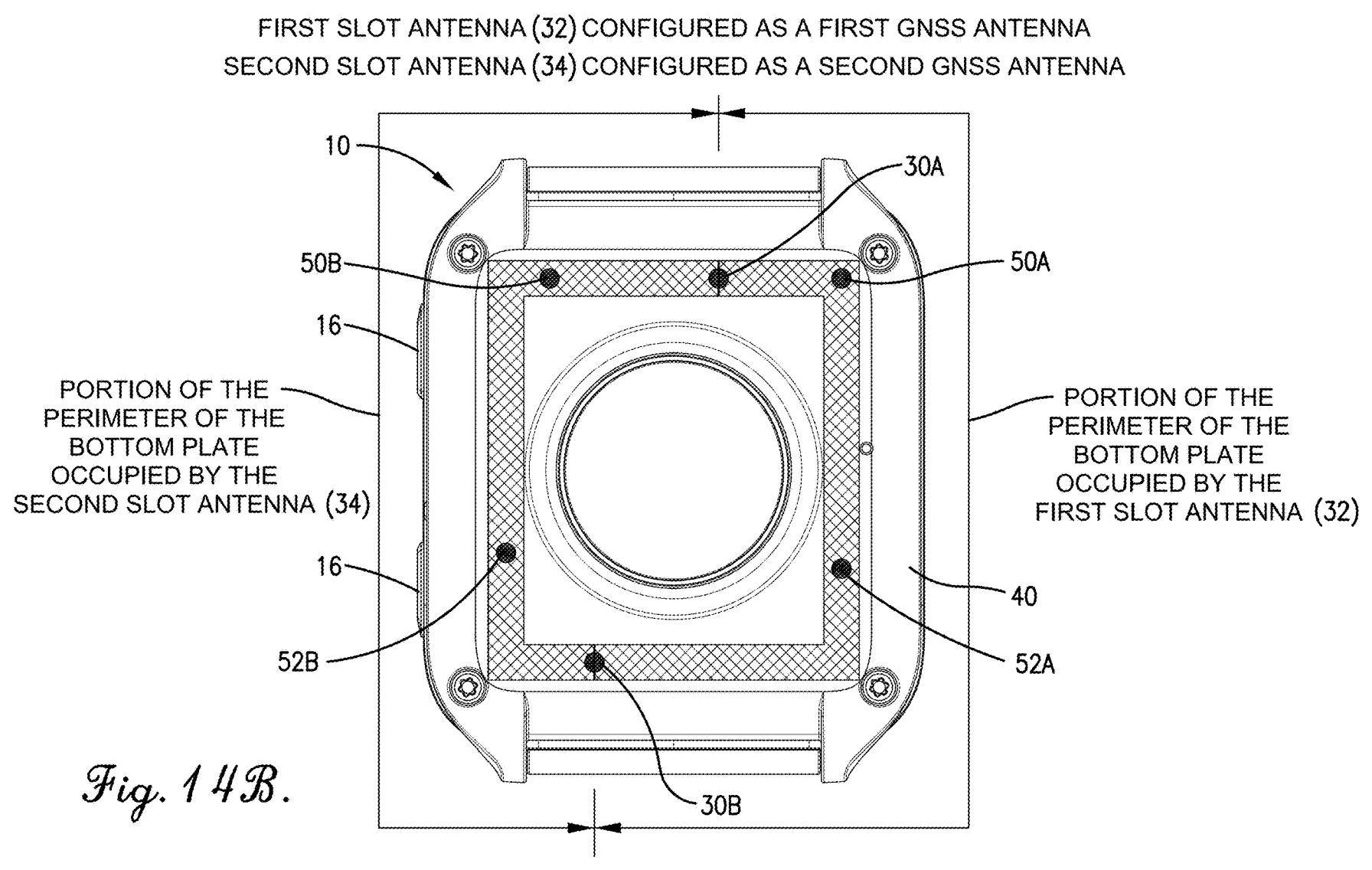

FIRST SLOT ANTENNA (32) CONFIGURED AS A FIRST GNSS ANTENNA
SECOND SLOT ANTENNA (34) CONFIGURED AS A SECOND GNSS ANTENNA

PORTION OF THE PERIMETER OF THE BOTTOM PLATE OCCUPIED BY THE FIRST SLOT ANTENNA (32)

PORTION OF THE PERIMETER OF THE BOTTOM PLATE OCCUPIED BY THE SECOND SLOT ANTENNA (34)

WATCH WITH BIPLANAR SLOT ANTENNA CONFIGURATION

CROSS-REFERENCE TO RELATED APPLICATIONS

The current patent application is a non-provisional utility patent application which claims priority benefit, with regard to all common subject matter, under 35 U.S.C. § 119(e) of earlier-filed U.S. Provisional Application Ser. No. 63/597,967, filed Nov. 10, 2023; and entitled "WATCH WITH BIPLANAR SLOT ANTENNA CONFIGURATION." The Provisional Application is hereby incorporated by reference, in its entirety, into the current patent application.

BACKGROUND

Wrist-worn electronic devices often include functionality that may be used to track wearers' current location, distance traveled, velocity, and other performance metrics or data. A wrist-worn electronic device is typically utilized by people who are walking, jogging, running, biking, hiking, backpacking, camping, mountain climbing, geocaching, or the like. This functionality may be provided by receiving location signals from a satellite-based positioning system, such as the global navigation satellite system (GNSS). Often, greater accuracy is desired, which requires receiving location signals output by the satellite-based positioning system on two GNSS frequency bands or data channels. Such electronic devices typically include an antenna, a location determining element, and a screen. It is generally understood that a more accurate determination of the user's current location may be made by a location determining element based on location signals output by satellite systems using two or more frequency bands. For example, the location determining element may more accurately determine a current geolocation of the device based on GNSS signals output on two frequency bands, such as the L1 and L5 bands for GPS, than a determination based on only one of the two bands. In addition, such devices may communicate wirelessly with other electronic devices, systems, or networks to monitor a user's activities and their performance during the activities, upload and download data, receive messages and information, and so forth. The communication protocols utilized to transmit and receive information may include Bluetooth, Wi-Fi, or telecommunications, such as cellular, signaling protocols. The electronic device may include three or more antennas that are utilized to receive location signals from GNSS satellites and communication signals to wirelessly communicate with other electronic devices, systems or networks.

SUMMARY

Embodiments of the current technology provide a wrist-worn electronic device that makes use of components of a housing to form at least two antennas, each of which is positioned on a separate horizontal plane. The electronic device broadly comprises the housing, a printed circuit board, a first slot antenna, and a second slot antenna. The housing includes a circumferential side wall, a bezel coupled to an upper surface of the side wall, and a bottom plate coupled to a lower surface of the side wall. The bezel and the bottom plate are each formed from electrically conductive material. The printed circuit board is positioned within the housing between the bezel and the bottom plate and at least partially forms a ground plane. The first slot antenna is configured to transmit a first wireless signal, receive the first wireless signal, or both, wherein the first wireless signal has a first frequency. The first slot antenna is formed in part by a first portion of a circumference of the bezel, and the ground plane of the printed circuit board. The second slot antenna is configured to transmit a second wireless signal, receive the second wireless signal, or both, wherein the second wireless signal has a second frequency. The second slot antenna is formed in part by the ground plane of the printed circuit board, and a first portion of a circumference of the bottom plate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current technology will be apparent from the following detailed description of the embodiments and the accompanying drawing figures.

BRIEF DESCRIPTION OF DRAWINGS

Embodiments of the current technology are described in detail below with reference to the attached drawing figures, wherein:

FIG. 14B is a bottom plan view of the electronic device of FIG. 11C illustrating a location of a plurality of bottom plate conductive elements along with a portion of a circumference of the bottom plate occupied by the plurality of slot antennas.

Figure 1:
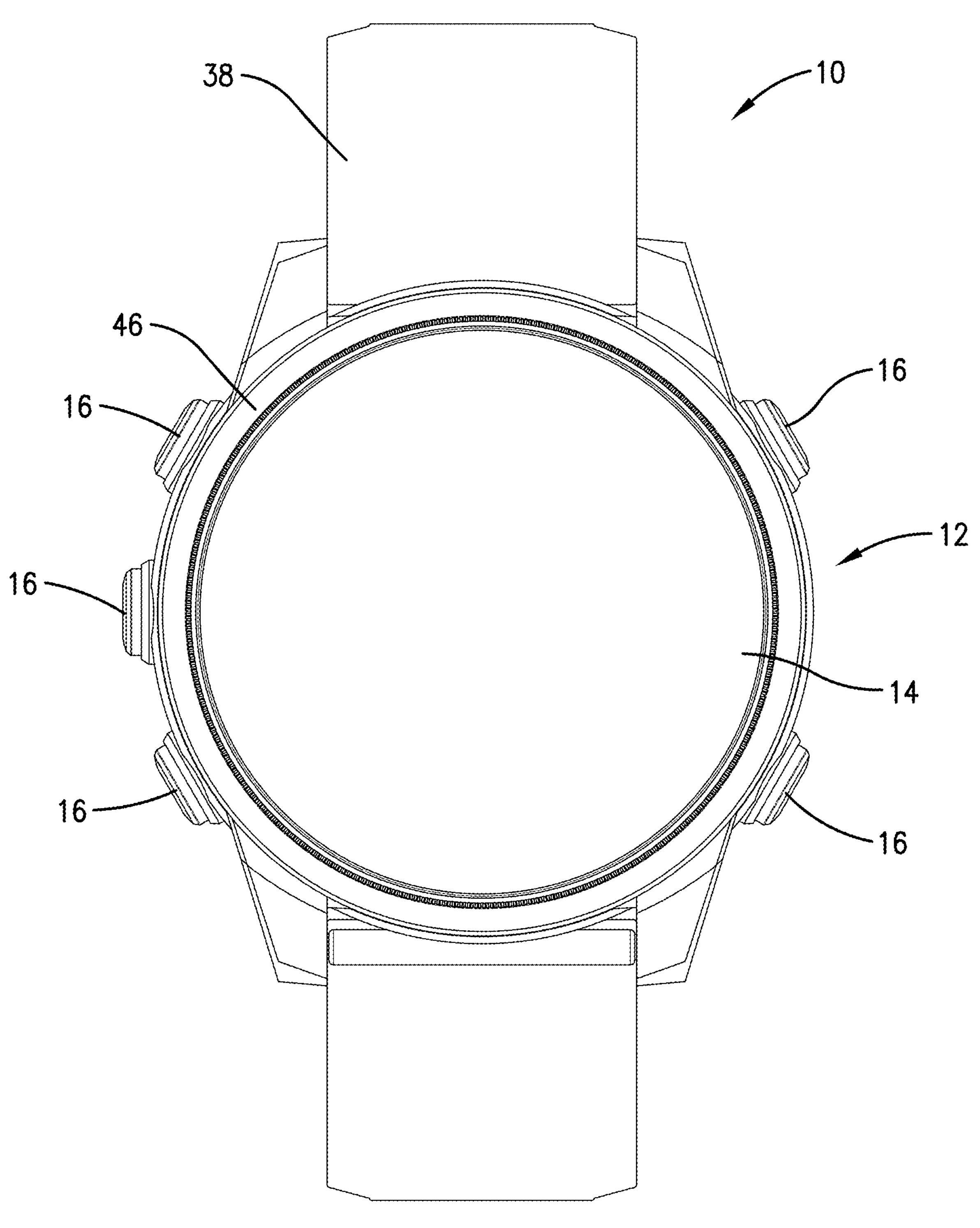
FIG. 1 is a top plan view of an electronic device, constructed in accordance with various embodiments of the current technology, including a plurality of slot antennas configured to receive location signals having frequencies in two GNSS frequency bands and transmit and receive communication signals using one or more communications protocols.

The drawing figures do not limit the current technology to the specific embodiments disclosed and described herein. The drawings are not necessarily to scale, emphasis instead being placed upon clearly illustrating the principles of the technology.

DETAILED DESCRIPTION OF THE TECHNOLOGY

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current technology. The following detailed description is, therefore, not to be taken in a limiting sense. The scope of the current technology is defined only by the appended claims, along with the full scope of equivalents to which such claims are entitled.

Relational and/or directional terms, such as “above”, “below”, “up”, “upper”, “upward”, “down”, “downward”, “lower”, “top”, “bottom”, “outer”, “inner”, etc., along with orientation terms, such as “horizontal” and “vertical”, may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Conventional wrist-worn electronic devices may be configured to accommodate an antenna formed by an electrically conductive bezel, a printed circuit board providing a ground plane, and electrical connections to two electrical ground terminals to form a nonconductive slot. The slot antenna may be electrically coupled with a location determining component or a communication element to transmit or receive electronic signals to determine a current geographic location or enable wireless communication with other electronic devices. The bezel may have electrical connections to an electronic signal terminal and two electrical ground terminals.

The bezel of some conventional wrist-worn electronic devices may partially form an antenna that wirelessly transmits or receives electronic signals. This principle has been used heretofore in wrist-worn electronic devices, such as watches, having a housing, bezel, and an antenna configured to transmit and receive signals communication systems or devices (e.g., Bluetooth™, Wi-Fi™, ANT™, etc.) and/or receive location wireless signals from a satellite-based positioning system (e.g., GPS), where the antenna is integrated with at least a portion of the bezel and coupled with a conductive component at least partially positioned in an internal cavity of the housing.

It is generally understood that conventional wrist-worn electronic devices may include a housing incorporating one or more slot antennas that utilize a bezel to form an upper surface of the one or more slot antennas and either a perimeter of a printed circuit board or an upper surface of a side wall to form a lower surface of the one or more slot antennas. If the lower surface of the one or more slot antennas is formed by a perimeter of a printed circuit board, the side wall of the housing is typically formed of a non-conductive material. If the lower surface of the one or more slot antennas is formed by an upper surface of a side wall, the side wall of the housing is typically formed of a conductive material. Accordingly, conventional wrist-worn electronic devices incorporating two slot antennas that utilize a bezel to form an upper surface of each slot antenna and a perimeter of a printed circuit board to form a lower surface of each slot antenna may have the slot antennas positioned adjacent to one another or separated laterally from one another.

Embodiments of the present invention relate to configurations of a wrist-worn electronic device including a housing having at least two slot antennas that are positioned above or below one another or separated vertically from one another. The perimeter of a printed circuit board forms both a lower surface of a first slot antenna positioned in an upper portion of the side wall and an upper surface of a second slot antenna positioned in a lower portion of the side wall. In such embodiments, a bezel forms an upper surface of the first slot antenna and a bottom plate formed of an electrically conductive material forms a lower surface of the second slot antenna. The side portions of the first slot antenna and the second slot antenna are formed by electrical connections extending between the printed circuit board and the opposing surface of each slot antenna, which is the bezel for the first slot antenna and the bottom plate for the second slot antenna. Specifically, the side portions of the first slot antenna are formed by bezel conductive elements extending between two points on the bezel and corresponding points on the perimeter of the printed circuit board. Similarly, the side portions of the second slot antenna are formed by bottom plate conductive elements extending between two points on the bottom plate and corresponding points on the perimeter of the printed circuit board.

In embodiments, the upper portion of the side wall corresponding to a height of the bezel conductive elements is substantially equal to the lower portion of the side wall corresponding to the bottom plate conductive elements. In such embodiments, the printed circuit board may be secured horizontally within an inner cavity of the housing at a position in the vertical plane that is substantially equidistant to the bezel and the bottom plate. In other embodiments, the upper portion of the side wall corresponding to a height of the bezel conductive elements is larger than the lower portion of the side wall corresponding to the bottom plate conductive elements. In such embodiments, the printed circuit board may be secured horizontally within an inner cavity of the housing at a position in the vertical plane that is closer to the bottom plate than the bezel. Similarly, in embodiments, the lower portion of the side wall corresponding to a height of the bottom plate conductive elements is larger than the upper portion of the side wall corresponding to the bezel conductive elements. In such embodiments, the printed circuit board may be secured horizontally within an inner cavity of the housing at a position in the vertical plane that is closer to the bezel than the bottom plate.

The printed circuit board being secured at a position between the bezel and the bottom plate and used as a common electrical ground plane requires electrical isolation between the first slot antenna in the upper portion of the side wall and the second slot antenna in the lower portion of the side wall. In some cases, the direction of the electrical current (I) for each slot antenna must be taken into account in order for each slot antenna to operate at or above a desired efficiency level. For instance, for each slot antenna, the components of and signal traces on the printed circuit board may be positioned to reduce or minimize cancellation of current flow associated with each slot antenna. Improved electrical isolation between the upper slot antenna and the lower slot antenna may reduce such current flow cancellation that may otherwise occur due to the common electrical ground plane formed by the printed circuit board.

The electronic device may be a fitness watch, a wrist-worn smart phone, a wrist-worn navigation device, or other wearable multi-function electronic devices that include a housing and a wrist band, strap, or other attachment mechanism. Although the electronic device is typically worn on a wrist, it may also be worn on other parts of the body such as an extremity, the forearm or the upper arm. The electronic device may be used to determine the user's current location, distance traveled, velocity, and other performance metrics by receiving location wireless signals from a satellite-based positioning system such as the global navigation satellite system (GNSS). In embodiments, the wrist-worn device may receive GNSS location wireless signals from the satellite-based positioning system having a single band of frequencies. In other embodiments, in order to further improve the accuracy of the location determination and related performance metrics, the electronic device may be configured to wirelessly receive GNSS signals having two separate frequency bands, such as the L1 and L5 GPS bands. In addition, the electronic device may be electronically paired and communication with other devices, such as a heart rate monitor that is typically worn around the user's chest, a foot pod attached to the user's shoe for measuring jogging or running cadence and distance, a bike speed and cadence sensor attached to a crank arm or a wheel hub of the user's bicycle for determining and tracking cycling performance, and so forth. Furthermore, the electronic device may be able to communicate with smartphones, tablets, laptop or desktop computers, Wi-Fi routers, cell towers, and the like, to allow the user to transmit (upload) location and activity data, download apps, stream (continuously download) music, receive text messages, emails, and weather alerts, and so on. Thus, the electronic device may receive and/or transmit, utilize or process location wireless signals, such as GNSS signals output by a satellite system, or communication signals, such as signals that utilize Bluetooth™, Wi-Fi, or telecommunication cellular protocols, and so forth. Typically, each type of signal, and in some cases protocol, may require use of separate antennas, within the housing or the bezel of the device, to wirelessly transmit and/or receive various signals.

In order to transmit and/or receive wireless signals, an antenna is formed from electrically conductive materials, such as metals and/or metal alloys which radiate and generate electromagnetic fields when an electronic signal is applied. The electronic device includes a bottom plate, at least one printed circuit board, and a bezel, each of which is formed from, or includes, electrically conductive materials. In addition, the bottom plate, the printed circuit board, and the bezel are spaced apart from one another on separate horizontal planes. A slot type of antenna includes electrically conductive components that are spaced apart from one another to create a slot opening which electromagnetically radiates when an electronic signal is applied. Given that the electronic device, by default, includes the structural components to form a plurality of slot antennas, the electronic device includes a first slot antenna, a second slot antenna, and a third slot antenna. Furthermore, by utilizing both the bottom plate and the bezel as antenna components, at least two of the slot antennas can be stacked one on top of the other.

Embodiments of the technology will now be described in more detail with reference to the drawing figures. Referring initially to FIGS. 1-4, a wrist-worn electronic device 10 is illustrated. The electronic device 10 broadly comprises a housing 12, a display 14, a user interface 16, a memory element 18, a processor 20, a location determining element 22, a communication element 24, a printed circuit board 26, a plurality of bezel conductive elements 28, a plurality of bottom plate conductive elements 30, a first slot antenna 32, a second slot antenna 34, and a third slot antenna 36. The electronic device 10 may also include a wrist band 38, a strap, or other attachment mechanisms. In addition, communication between various electronic components of the electronic device 10 is illustrated schematically in FIG. 4.

Figure 5:
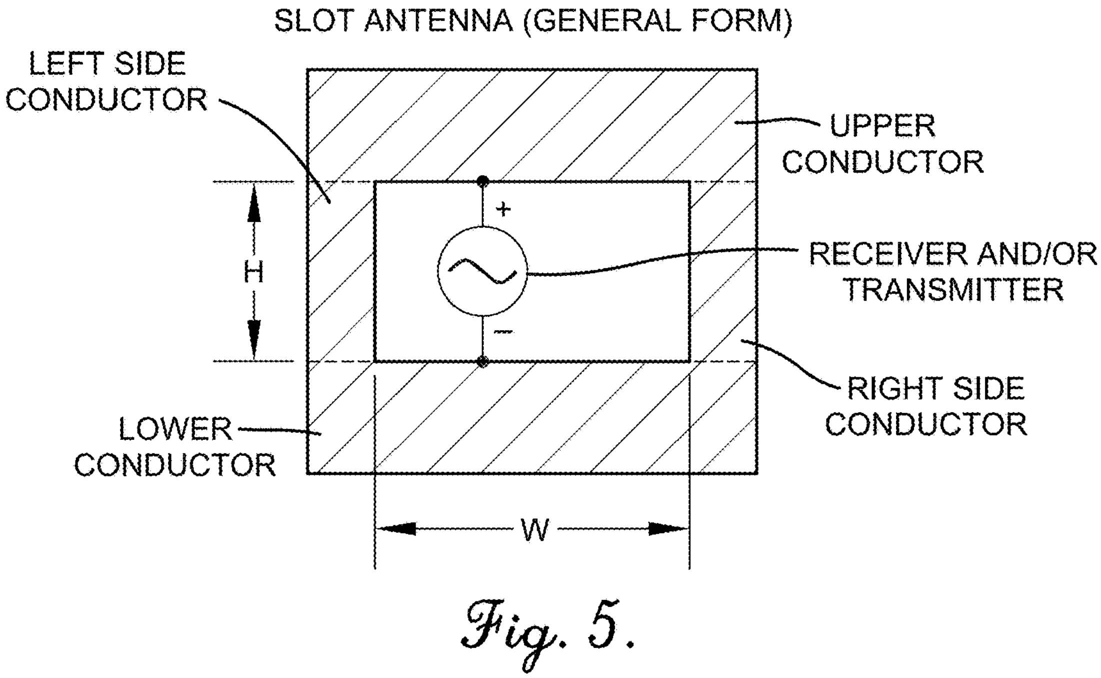
FIG. 5 is a schematic diagram of a general form of a slot antenna.

Each slot antenna 32, 34, 36 converts wireless RF electromagnetic radiation (a wireless signal) at a particular frequency, i.e., a resonant frequency, into a corresponding electronic signal and converts an electronic signal into (or from) a corresponding wireless signal. In embodiments, the wrist-worn electronic device 10 may include additional antennas, such as one or more loop antennas, microstrip antennas, patch antennas, linear antennas, inverted-F antennas, inverted-L antennas, dipole antennas, or the like. Referring to FIG. 5, the slot antenna 32, 34, 36, in its general form, includes an electronic signal feed point and an open-centered quadrilateral structure formed from electrically conductive, electromagnetic radiating material, such as metals or metal alloys. The structure of the slot antenna 32, 34, 36 includes an upper conductor, a lower conductor, a left side conductor, and a right side conductor connected to one another to form or create a slot or aperture in the center of the structure. The slot has a height, labeled "H", and a width, labeled "W". The perimeter of the slot (i.e., 2H+2 W) corresponds to a full wavelength of the frequency of the wireless signal that is to be received and/or transmitted and a width of the upper conductor (W) and the lower conductor (W) corresponds to, or varies according to, a half wavelength of the frequency of that wireless signal. An electronic signal receiver and/or transmitter, such as the location determining element 22 or the communication element 24, is electrically connected to a lower edge of the upper conductor (an upper edge of the slot) and an upper edge of the lower conductor (a lower edge of the slot). An electronic signal is electronically communicated between the electronic signal receiver and/or transmitter and the slot antenna 32, 34, 36.

Figure 6:
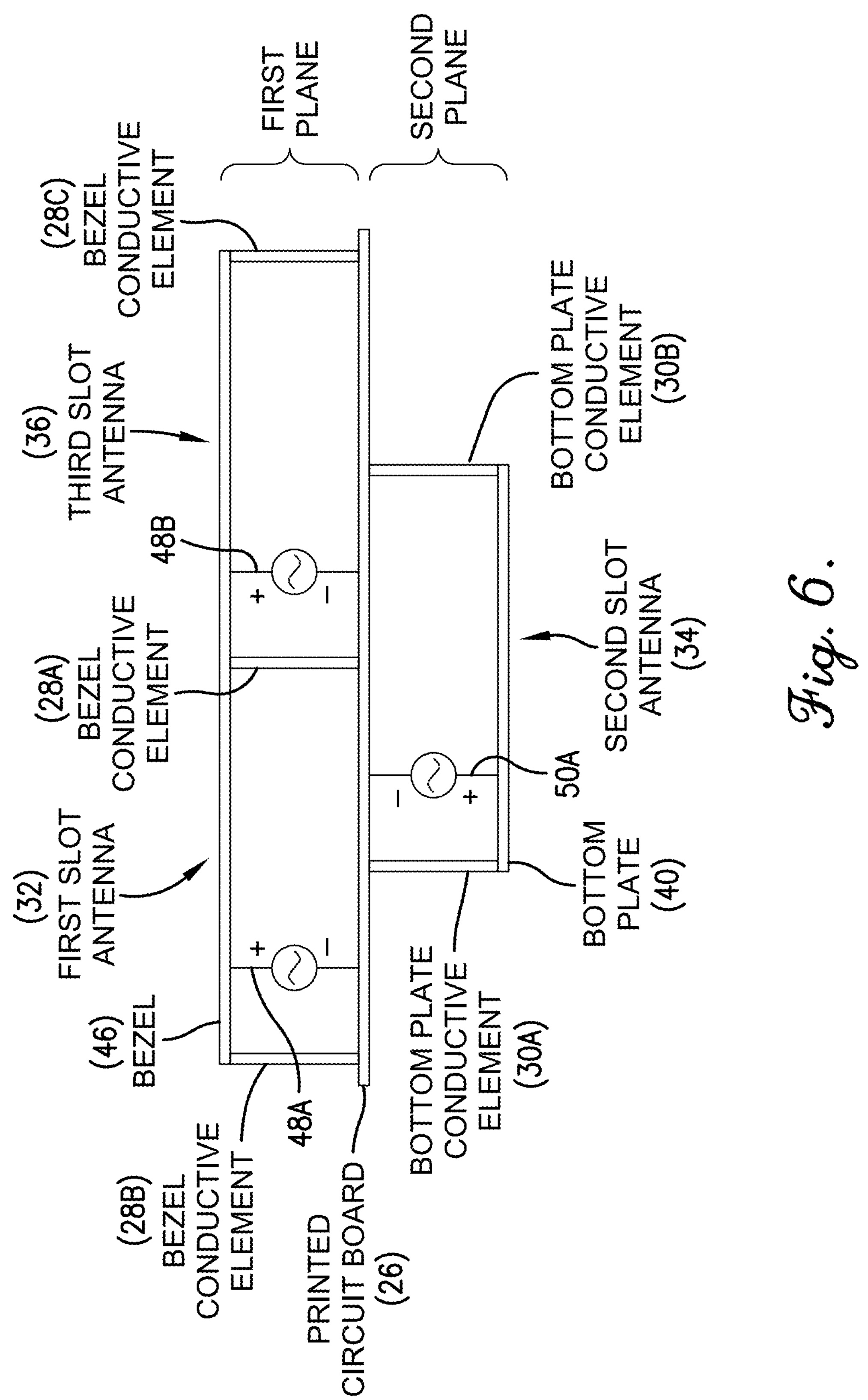
FIG. 6 is a schematic diagram of a plurality of slot antennas implemented in the electronic device of FIG. 1 on at least two vertically-separated horizontal planes.

The slot antennas 32, 34, 36 of the electronic device 10 make use of certain components discussed below to form the structure of each antenna that surrounds the slot. For example, in general, a portion of the bezel 46 may be utilized to form the upper conductor of the slot antenna 32, 34 or 36, one or more full or partial conductive planes of the printed circuit board 26 may be utilized to form a portion of the slot antenna 32, 34 and/or 36 (the upper conductor or the lower conductor, as applicable), and one or more portions of a bottom plate 40 may be utilized to form the lower conductor of the slot antenna 32, 34 or 36. The left side and right side conductors of each slot antenna 32, 34, or 36 may be formed by the bezel conductive elements 28 or the bottom plate conductive elements 30. This utilization of the various components of the electronic device 10 to form the structures of the slot antennas 32, 34, 36 allows for at least two of the slot antennas 32, 34, 36 (such as the first slot antenna 32 and the second slot antenna 34) to be stacked one on top of the other, or overlap one another, along multiple horizontal planes or levels, as shown in FIG. 6. Furthermore, each slot antenna 32, 34, 36 can be configured to perform any of the wireless signal transmission and reception functions of the electronic device 10. That is, any of the slot antennas 32, 34, 36 can be configured to receive the GPS L1 band wireless signal, any of the slot antennas 32, 34, 36 can be configured to receive the GPS L5 band wireless signal, and any one or more of the slot antennas 32, 34, 36 can be configured to transmit and receive common wireless communication protocols such as Bluetooth™, Wi-Fi, and/or cellular signals. Specific configurations or implementations of the slot antennas 32, 34, 36 for the wireless signal functions are described as follows.

Figure 2:
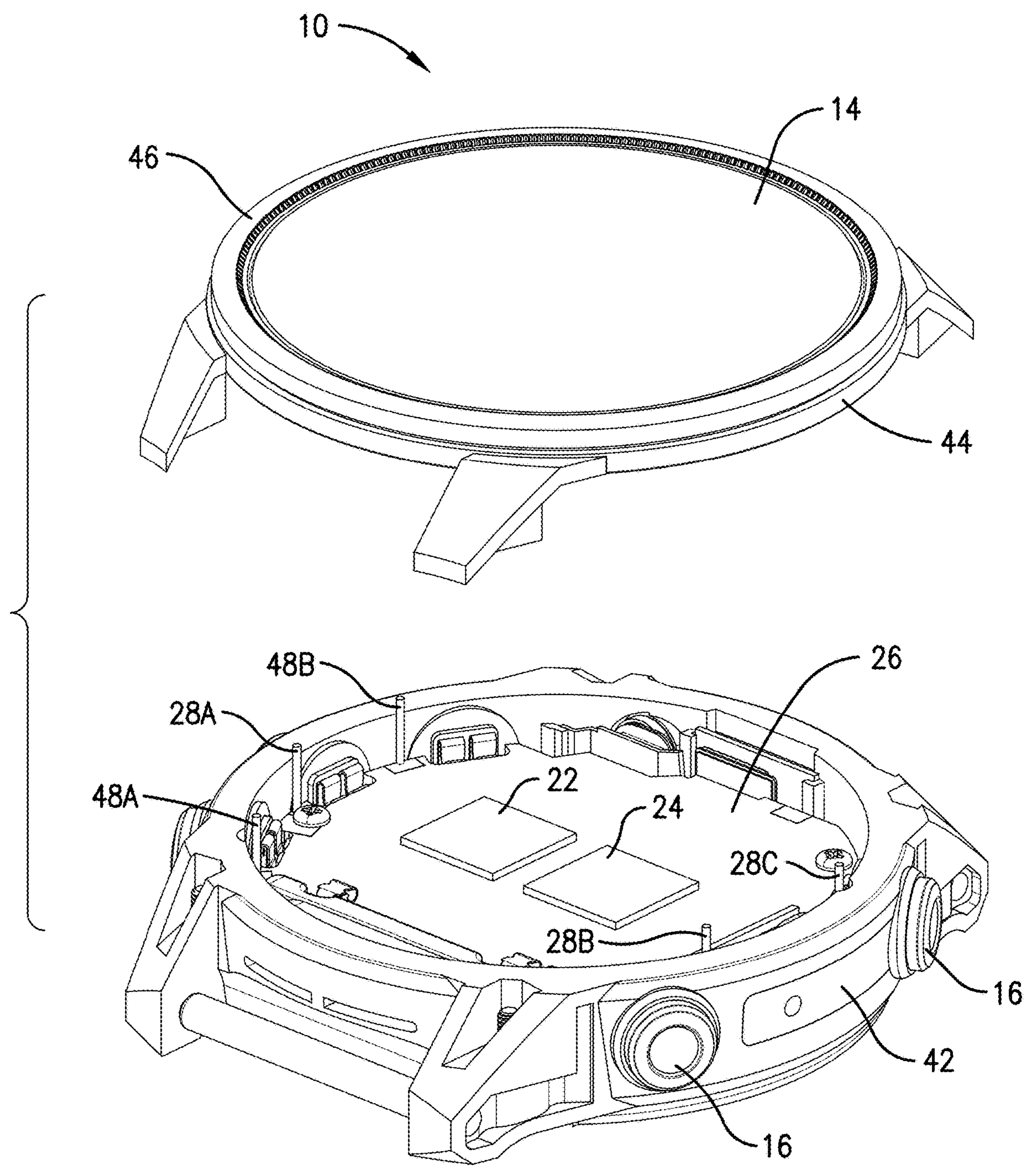
FIG. 2 is an upper perspective exploded view of the electronic device of FIG. 1 with a display and a bezel removed from other portions of the housing to reveal an internal cavity including a printed circuit board, a location determining element, a communication element, and a plurality of bezel conductive elements.
Figure 3:
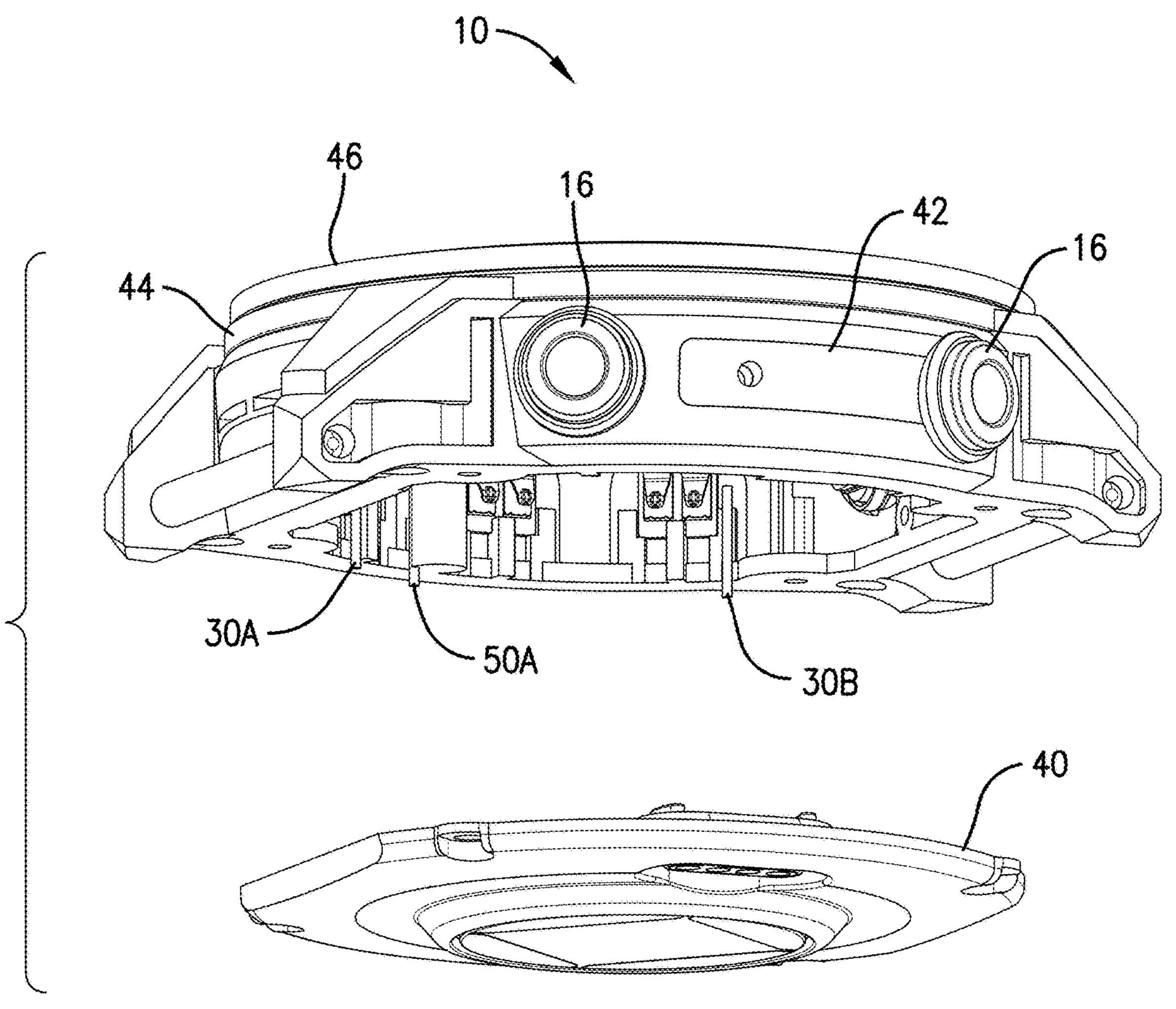
FIG. 3 is a lower perspective exploded view of the electronic device of FIG. 1 with a bottom plate removed from other portions of the housing to reveal the internal cavity including a plurality of bottom plate conductive elements.
Figure 4:
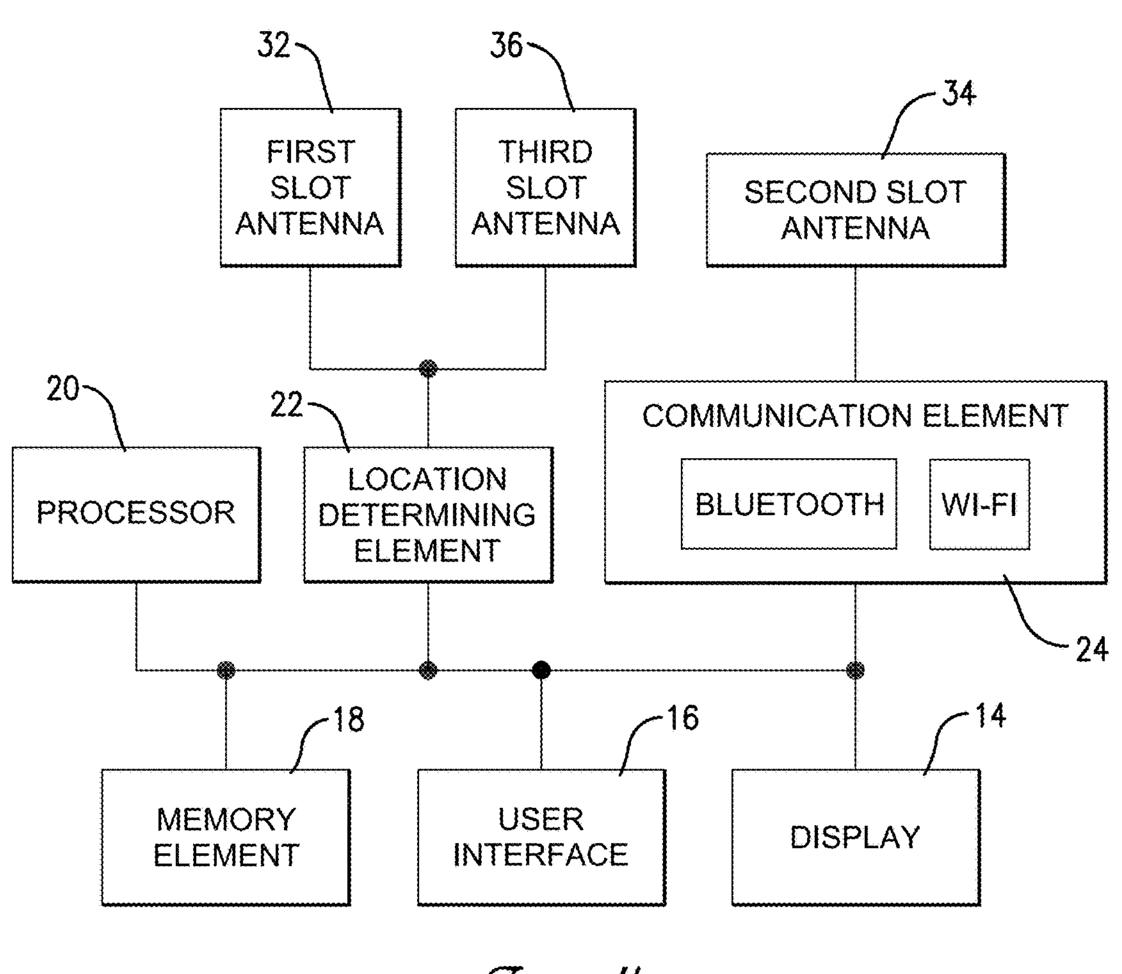
FIG. 4 is a block schematic diagram illustrating the communication between various components of the electronic device of FIG. 1.

The housing 12, as shown in FIGS. 1-3, generally houses or retains other components of the electronic device 10 and may include or be coupled to the wrist band 38. The housing 12 includes the bottom plate 40, a side wall 42, a bezel retainer 44, and a bezel 46. The bottom plate 40 includes an upper, inner surface and a lower, outer surface that contacts an upper surface of the user's wrist while the user is wearing the electronic device 10. The bottom plate 40 may also include one or more openings from the outer surface to the inner surface which accommodate battery charging and/or data communication connectors or the like. In addition, the bottom plate is formed from electrically conductive materials, such as metals and/or metal alloys, which are electromagnetically radiating.

The side wall 42 couples to the bottom plate 40 at a lower edge of the side wall 42. The side wall 42 includes an outer surface and an opposing inner surface and may have a plurality of through holes, each of which passes from the outer surface to the inner surface to retain one or more pushbuttons or other user interface 16 components. The side wall 42 may further include extensions which retain first and second bars to which the wrist band attaches. The side wall 42 is formed from electrically non-conductive (insulating) material such as plastic polymers or the like.

The bezel retainer 44 couples to the side wall at an upper edge thereof. The bezel retainer 44 is formed from electrically non-conductive (insulating) material such as plastic polymers or the like. In various embodiments, the bezel retainer 44 may be integrated with the side wall 42 or may be optional, wherein the bezel 46 couples to an upper surface of the side wall 42.

The bezel 46 couples to the bezel retainer 44 along an upper surface thereof. The bezel 46 includes an upper surface, which in exemplary embodiments, may be substantially planar, tilted or slanted, and a lower surface that is generally planar. The bezel 46 forms a central opening through which the display 14 is visible and may, itself, retain a lens or other components that cover the display 14. The bezel 46 is formed from electrically conductive materials, such as metals and/or metal alloys, which are electromagnetically radiating.

In exemplary embodiments, the housing 12 generally has a rounded or circular shape, wherein the bottom plate 40 has a disc shape, the side wall 42 has a hollow cylindrical shape, the bezel retainer 44 has a ring shape, and the bezel 46 has an annular shape. In other embodiments, the housing 12 may have one of a variety of geometric or polygonal shapes, such as triangular, square or rectangular, hexagonal, octagonal, and so forth.

The display 14 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The display 14 may include a screen on which information is presented, with the screen possessing any one of a variety of shapes, such as a square or a rectangular aspect ratio that may be viewed in either a landscape or a portrait mode. In some embodiments, the display 14 may further include a lens and other components overlying the viewing area, which may enhance the visibility of the information shown on the display 14. In various embodiments, the display 14 may also include a touch screen occupying the entire screen or a portion thereof so that the display 14 functions as part of the user interface 16. The touch screen may allow the user to interact with the electronic device 10 by physically touching, swiping, or gesturing on areas of the screen. The display 14 may be in communication electronic with the memory element 18 and the processor 20 and may receive data or information therefrom that is to be shown on the display 14. In exemplary embodiments, the display 14 is generally surrounded by the bezel 46.

The user interface 16 generally allows the user to directly interact with the electronic device 10 and may include pushbuttons, rotary knobs, or the like. In exemplary embodiments of FIGS. 1-3, the housing 12 may include one or more pushbuttons and/or rotary knobs located in the through holes of the side wall 42 that function as at least a portion of the user interface 16. The user interface 16 may allow the user to scroll through menus or change screens in order to control the function or operation of the electronic device 10.

The memory element 18 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, solid state memory, or the like, or combinations thereof. In some embodiments, the memory element 18 may be embedded in, or packaged in the same package as, the processor 20. The memory element 18 may include, or may constitute, a non-transitory "computer-readable medium". The memory element 18 may store the instructions, code, code statements, code segments, software, firmware, programs, applications, apps, services, daemons, or the like that are executed by the processor 20. The memory element 18 is in communication electronic with the processor 20 and may also store data that is received by the processor 20 or the device in which the processor 20 is implemented. The processor 20 may further store data or intermediate results generated during processing, calculations, and/or computations as well as data or final results after processing, calculations, and/or computations. In addition, the memory element 18 may store settings, text data, documents from word processing software, spreadsheet software and other software applications, sampled audio sound files, photograph or other image data, movie data, databases, and the like.

The processor 20 may comprise one or more processors that include electronic hardware components such as microprocessors (single-core or multi-core), microcontrollers, digital signal processors (DSPs), field-programmable gate arrays (FPGAs), analog and/or digital application-specific integrated circuits (ASICs), intelligence circuitry, or the like, or combinations thereof. The processor 20 may generally execute, process, or run instructions, code, code segments, code statements, software, firmware, programs, applications, apps, processes, services, daemons, or the like. The processor 20 may also include hardware components such as registers, finite-state machines, sequential and combinational logic, configurable logic blocks, and other electronic circuits that can perform the functions necessary for the operation of the current invention. In certain embodiments, the processor 20 may include multiple computational components and functional blocks that are packaged separately but function as a single unit. In some embodiments, the processor 20 may further include multiprocessor architectures, parallel processor architectures, processor clusters, and the like, which provide high performance computing. The processor 20 may be in electronic communication with the other electronic components of the electronic device 10 through serial or parallel links that include universal busses, address busses, data busses, control lines, and the like. In addition, the processor 20 may include analog to digital converters (ADCs) to convert analog electronic signals to digital data values, or streams of digital data values, and/or digital to analog converters (DACs) to convert digital data values, or streams of digital data values, to analog electronic signals.

The processor 20 is operable, configured, and/or programmed to perform the following functions, operations, processes, methods, and/or algorithms of the electronic device 10 by utilizing hardware, software, firmware, or combinations thereof. Other components, such as the communication element 24 and the memory element 18 may be utilized as well.

The location determining element 22 generally determines a current geolocation of the electronic device 10 and may receive and process radio frequency (RF) wireless signals, such as wireless location signals, output by satellites of a multi-constellation GNSS such as the global positioning system (GPS) utilized in the United States, the GLONASS system utilized in Russia, the Galileo system utilized in Europe, or the like. The location determining element 22 may include satellite navigation receivers, processors, controllers, other computing devices, or combinations thereof, and memory. The location determining element 22 receives and processes a first location electronic signal from a first one of the slot antennas 32, 34, 36 configured as a first GNSS antenna and a second location electronic signal from a second one of the slot antennas 32, 34, 36 configured as a second GNSS antenna.

In embodiments, the location determining component 22 may receive a first location signal in a first frequency band and a second location signal in a second frequency band. An exemplary first frequency band is the GPS L5 band with a center frequency of approximately 1176.45 megahertz (MHz) and an exemplary second frequency band is the GPS L1 band with a center frequency of approximately 1575.42 MHz. Alternatively, in embodiments, the first frequency band is the GPS L1 band with a center frequency of approximately 1575.42 MHz and the second frequency band is the GPS L5 band with a center frequency of approximately 1176.45 megahertz (MHz). In such embodiments, the first location electronic signal includes data and information output by a GPS satellite on the GPS L1 band, which has a center frequency of 1575.42 MHz. The second location electronic signal includes data and information output by a GPS satellite on the GPS L5 band, which has a center frequency of 1176.45 MHz. When the location determining element 22 receives the data and information received on both the GPS L1 band and the GPS L5 band, the location determining element 22 of the current technology determines the current geolocation of the electronic device 10 with greater accuracy than by utilizing data and information received on the GPS L1 band alone.

Although the location determining element 22 of the current technology receives and utilizes data and information received on multiple GPS frequency bands, it is to be understood that the current technology disclosed herein apply to a location determining element 22 configured to receive and utilize data and information from two or more frequency bands associated with other GNSS constellations, such as GLONASS or Galileo, and a location determining element 22 configured to receive and utilize data and information from one or more frequency bands associated with GPS and one or more bands associated with other GNSS constellations, such as GLONASS or Galileo.

It is to be understood that embodiments enabling receipt of location wireless signals in two bands may be applied to other first and second frequency bands. For example, the first frequency band may be the GPS L2 band with a center frequency of approximately 1227 MHz and the second frequency band may be the GPS L1 band with a center frequency of approximately 1575.42 MHz. Similarly, the first frequency band may be the GPS L5 band with a center frequency of approximately 1176.45 MHz and the second frequency band may be the GLONASS L1 band with a center frequency of approximately 1602 MHz. Similarly, the first frequency band may be the GPS L5 band with a center frequency of approximately 1176.45 MHz and the second frequency band may be an Iridium band with a center frequency of approximately 1621.25 MHz. Similarly, the first frequency band may be the GLONASS L2 band with a center frequency of approximately 1246 MHz and the second frequency band may be the GPS L1 band with a center frequency of approximately 1575.42 MHz. Similarly, the first frequency band may be the GLONASS L2 band with a center frequency of approximately 1246 MHz and the second frequency band may be the GLONASS L1 band with a center frequency of approximately 1602 MHz.

In embodiments, the first location electronic signal is converted by the first GNSS antenna from a first location wireless signal output by GPS satellites and having a frequency in the GPS L1 band, which has a center frequency of approximately 1575 MHz. The second location electronic signal is converted by the second GNSS antenna from a second location wireless signal output by GPS satellites and having a frequency in the GPS L5 band, which has a center frequency of approximately 1175 MHz. Each of the first and second location electronic signals includes data and information that the location determining element 22 is able to utilize to determine a current geolocation of the electronic device 10. The location determining element 22 can receive and utilize location wireless signals output by GPS satellites in the GPS L1 band and/or GPS L5 band. With the data and information from location signals output by GPS satellites on both the GPS L1 band and the GPS L5 band, the location determining element 22 of the current technology is capable of determining the current geolocation of the electronic device 10 with greater accuracy than conventional devices that may only utilize location signals output by GPS satellites on the GPS L1 band alone. The location determining element 22 communicate the determined current geolocation to the processor 20, store the determined current geolocation in the memory element 18, or both. Although the location determining element 22 of the current technology utilizes data and information from location wireless signals output on both GPS L1 and L5 bands, it is within the scope of the current technology for the location determining element 22 to utilize data and information from two or more bands from other GNSS constellations, such as GLONASS or Galileo. The location determining element 22 is mounted on the printed circuit board 26.

The communication element 24 processes a communication electronic signal that allows the electronic device 10 to communicate with other electronic devices, external systems, networks, such as a Bluetooth™ network and/or a cellular network. The communication element 24 may include signal and/or data transmitting and receiving circuits, such as amplifiers, filters, mixers, oscillators, DSPs, and the like that process RF electronic signals which include data transmitted and received using various communication standards. The communication element 24 processes the communication electronic signal with a frequency component ranging from approximately 2.40 gigahertz (GHz) to approximately 2.4835 GHz and includes data associated with communication standards such as ANT, ANT+, Bluetooth™, Bluetooth™ low energy (BLE), the industrial, scientific, and medical (ISM) band at 2.4 GHz, or the like. In addition, or instead, the communication electronic signal may include data that is associated with various Institute of Electrical and Electronics Engineers (IEEE) 802.11 Wi-Fi standards operating at 2.4 GHz. In other embodiments, the communication element 24 may be utilized to process the communication electronic signal with a frequency component at approximately 860 MHz (MHz) and includes data associated with communication standards utilized in cellular communications. Similarly, the communication element 24 may be utilized to process the communication electronic signal with a frequency component at approximately 5 GHz and includes data associated with various IEEE 802.11 Wi-Fi standards operating at 5 GHz. The communication element 24 may decode data that has been received in the communication electronic signal for one or more communication protocols and encode data in the communication electronic signal to be transmitted for one or more communication protocols. The communication electronic signal is communicated between the communication element 24 and a third one of the slot antennas 32, 34, 36 configured as a communication antenna. The communication element 24 is mounted on the printed circuit board 26.

The printed circuit board 26 retains a plurality of the components of the electronic device 10 and provides electrical connection and electronic communication therebetween. The printed circuit board 26 may be of generally known construction with a first side and an opposing second side. The printed circuit board 26 may also include multiple electrically conductive layers with a top conductive layer placed on the first side, a bottom conductive layer placed on the second side, one or more inner conductive layers positioned between the first and second sides, and an insulating layer between each pair of adjacent conductive layers. The insulating layers may be formed from rigidized or flexible material that includes various combinations of fiberglass, woven glass, matte glass, cotton paper, phenolic cotton paper, polyester, other polymers, epoxies, epoxy resins, and the like. Each electrically conductive layer may include one or more electrically conductive features, such as electronic signal traces, electric power or ground traces, one or more signal, power, or ground pads, integrated circuit package footprints, full or partial power planes, full or partial ground planes, or the like. Also, the electrically conductive features include passive electrical circuit components, such as resistors, capacitors, and inductors. The conductive layers may be formed from metals typically including copper, but also including nickel, aluminum, gold, silver, palladium, zinc, tin, lead, and the like. In addition, the printed circuit board 26 may include plated through hole vias, blind vias, buried vias, and the like. Furthermore, the printed circuit board 26 may include one or more partial or full signal planes and/or one or more signal traces which provide electrical connection, or a signal return path, for the first location electronic signal, the second location electronic signal, and the communication electronic signal. As a variety of components are positioned on and electrically coupled through the upper and lower surfaces of the printed circuit board 26, the printed circuit board 26 may have a shape that substantially corresponds to the shape of the housing 12. For instance, as seen in FIG. 2, an electronic device 10 having a substantially round housing 12 may contain within its inner cavity a substantially round printed circuit board 26.

Each bezel conductive element 28 and signal feed conductive element 48 is formed from electrically conductive materials, such as metals and/or metal alloys, which are electromagnetically radiating. The bezel conductive elements 28 and signal feed conductive elements 48, as shown in FIGS. 2, 7B, 8B and 9B, provide an electrical connection from a signal trace, a signal plane, a ground plane, or the like, as applicable, on the printed circuit board 26 to the bezel 46. The bezel conductive elements 28 may be embodied by pins, pogo pins, spring-loaded contacts, conductive clamps, and similar electrical connectors. Each bezel conductive element 28 forms a portion of the first slot antenna 32 and the third slot antenna 36, as described in more detail below.

Each bottom plate conductive element 30 and signal feed bottom plate conductive element 50 is formed from electrically conductive materials, such as metals and/or metal alloys, which are electromagnetically radiating. The bottom plate conductive elements 30 and the signal feed bottom plate conductive element 50, as shown in FIGS. 3, 7B, 8B, and 9B, provide an electrical connection from a signal trace, a signal plane, a ground plane, or the like, as applicable, on the printed circuit board 26 to the bottom plate 40. The bottom plate conductive elements 30 may be embodied by pins, pogo pins, spring-loaded contacts, conductive clamps, and similar electrical connectors. Each bottom plate conductive element 30 forms a portion of the second slot antenna 34, as described in more detail below.

In embodiments, the first slot antenna 32 is configured to receive a first frequency band of a GNSS signal, which in this exemplary embodiment is the GPS L1 band that has a center frequency of 1575.42 MHz. The first portion of the circumference of the bezel 46 associated with the first slot antenna 32 and the corresponding portion (perimeter) of the printed circuit board 26 between the bezel conduct elements 28A, 28B may each have a width that corresponds to one-half of the wavelength of the center frequency of the GPS L1 band. The second slot antenna 34 is configured to transmit and receive wireless communication signals utilizing Bluetooth™ and/or Wi-Fi having frequencies of approximately 2.4 GHz and frequencies commonly associated with cellular protocols. The first portion of the circumference of the bottom plate 40 associated with the second slot antenna 34 and the corresponding portion (perimeter) of the printed circuit board 26 between the bottom plate conductive elements 30A, 30B may each have a width that corresponds to one-half of the wavelength of the center frequency of the wireless communication signals, such as 2.4 GHz or 5 GHz. The third slot antenna 36 is configured to receive a second frequency band of a GNSS signal, which in this exemplary embodiment is the GPS L5 band that has a center frequency of 1176.45 MHz. The second portion of the circumference of the bezel 46 associated with the third slot antenna 36 and the corresponding portion (perimeter) of the printed circuit board 26 between the bezel conduct elements 28A, 28C may each have a width that corresponds to one-half of the wavelength of the center frequency of the GPS L5 band.

Figure 7A:
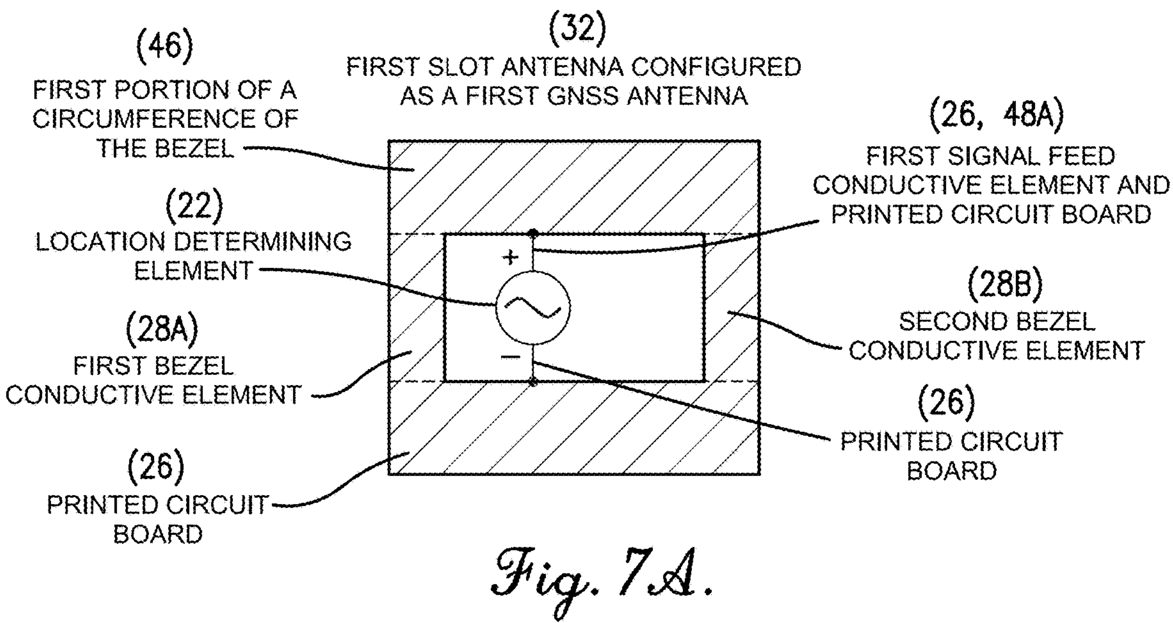
FIG. 7A is a schematic diagram of the structural components of a first slot antenna configured as a first GNSS antenna of the electronic device of FIG. 1.
Figure 7B:
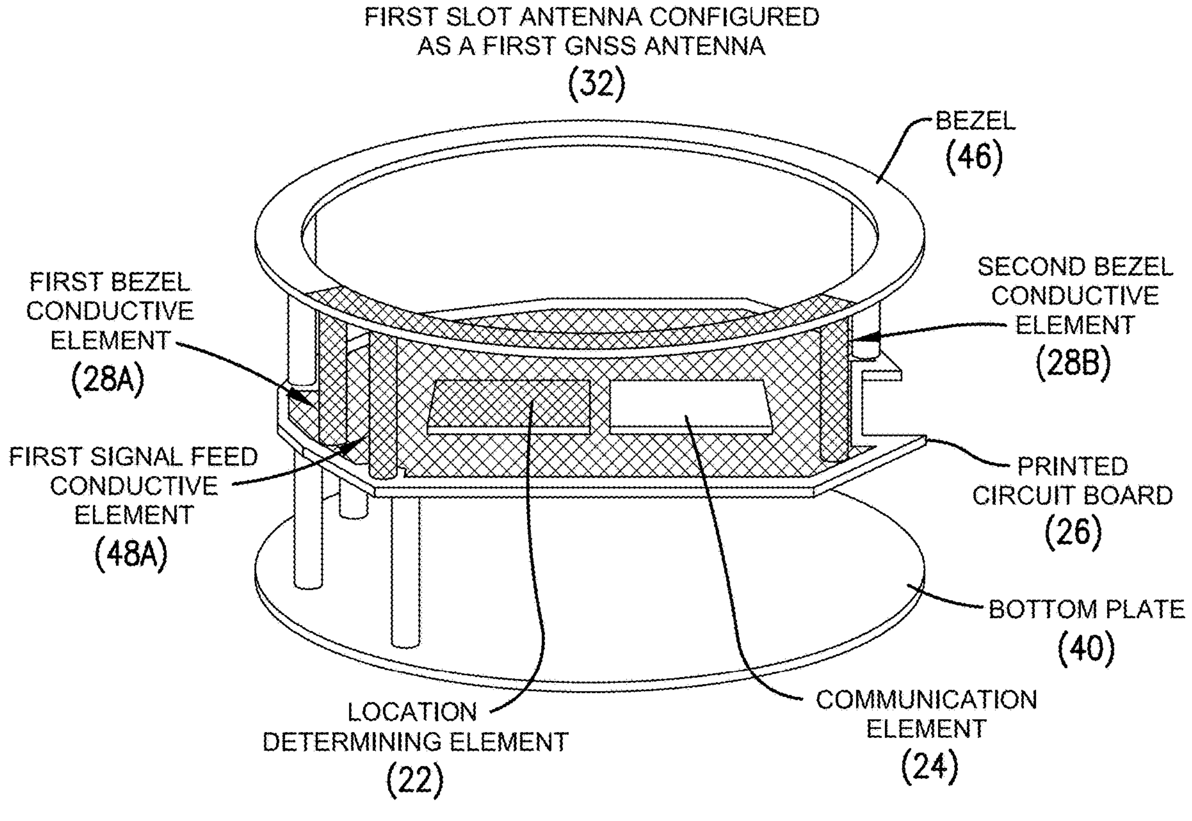
FIG. 7B is a simplified schematic representation with highlights of a first portion of the bezel, the bezel conductive elements, and the printed circuit board which form the first slot antenna of the electronic device of FIG. 1.
Figure 7C:
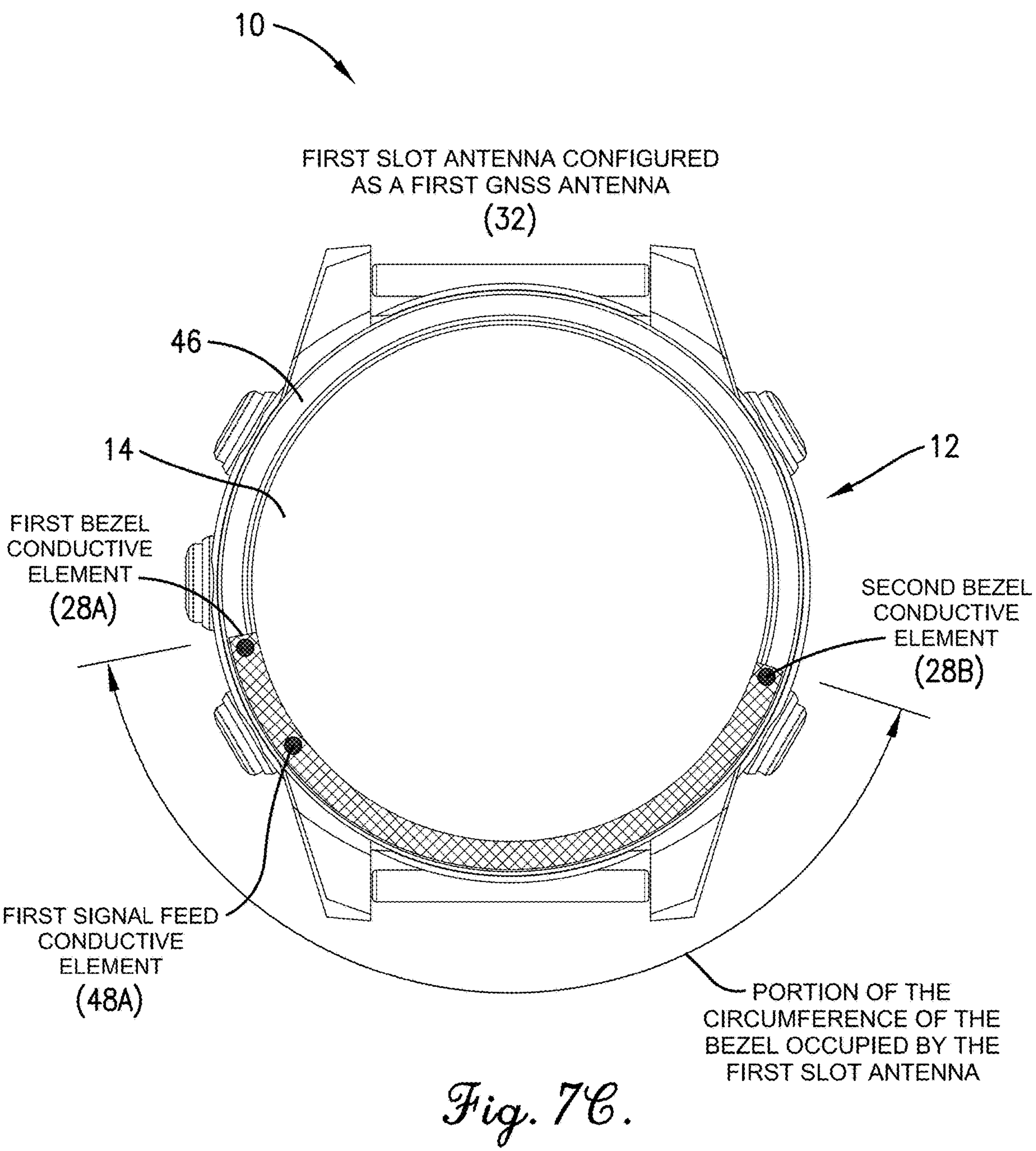
FIG. 7C is a top plan view of the electronic device of FIG. 1 illustrating a location of a plurality of bezel conductive elements along with the first portion of the bezel occupied by the first slot antenna.

Referring to FIGS. 7A, 7B, and 7C, the first slot antenna 32 may be configured as a first GNSS wireless signal antenna, which receives wireless location signals in the GPS L1 band of frequencies, centered at approximately 1575 MHz. The structure of the first slot antenna 32 is formed by the following components of the electronic device 10. The upper conductor of the first slot antenna 32 is formed by a first portion of a circumference of the bezel 46, as shown in FIGS. 7B and 7C, extending in a clockwise (CW) direction from approximately 4:00 to 8:00. The left side conductor of the first slot antenna 32 is formed by a first bezel conductive element 28A, which provides an electrical ground or common electronic signal path for the first slot antenna 32 and the third slot antenna 36. The right side conductor of the first slot antenna 32 is formed by a second bezel conductive element 28B, which provides an electrical ground or common electronic signal path for the first slot antenna 32 only. The lower conductor of the first slot antenna 32 is formed by the printed circuit board 26. The electronic signal receiver is the location determining element 22, which is electrically connected to the structure of the first slot antenna 32 through the one or more signal traces of the printed circuit board 26 and a first signal feed conductive element 48A, which provides a signal feed path for the first location electronic signal. Through the signal feed conductive element 48A and various signal traces or conductive planes on the printed circuit board 26, the first location electronic signal is electronically communicated between the first slot antenna 32 and the location determining element 22. The portions of the bezel 46 and the printed circuit board 26 that are associated with the first slot antenna 32 are shown in crosshatch in FIGS. 7B and 7C.

Figure 8A:
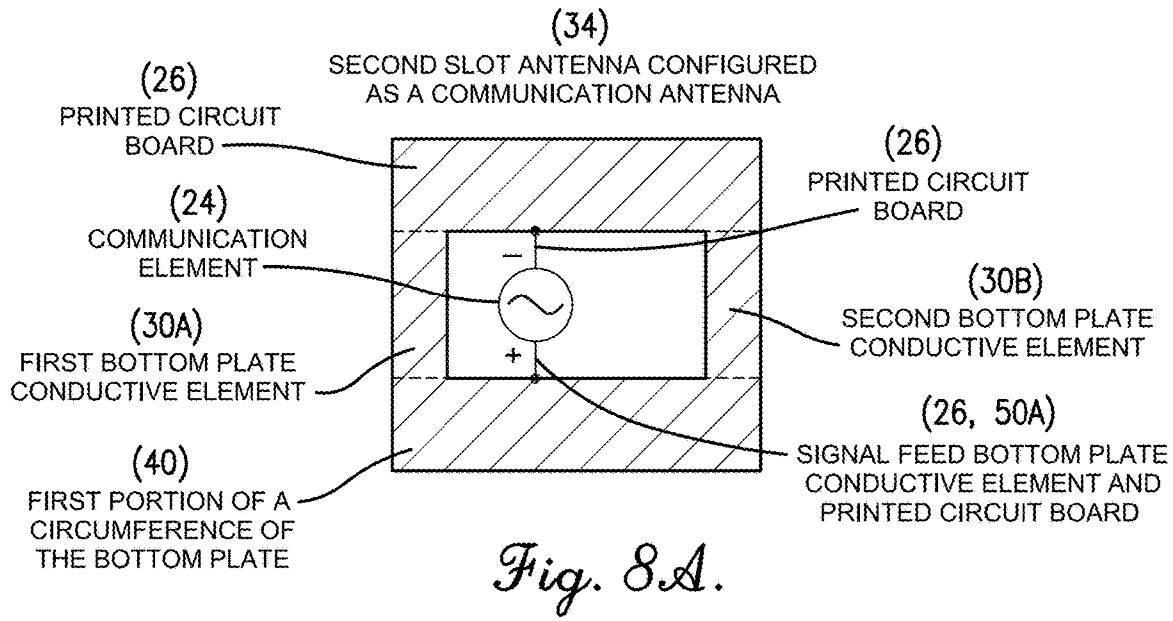
FIG. 8A is a schematic diagram of the components of a second slot antenna configured as a communication antenna of the electronic device of FIG. 1.
Figure 8B:
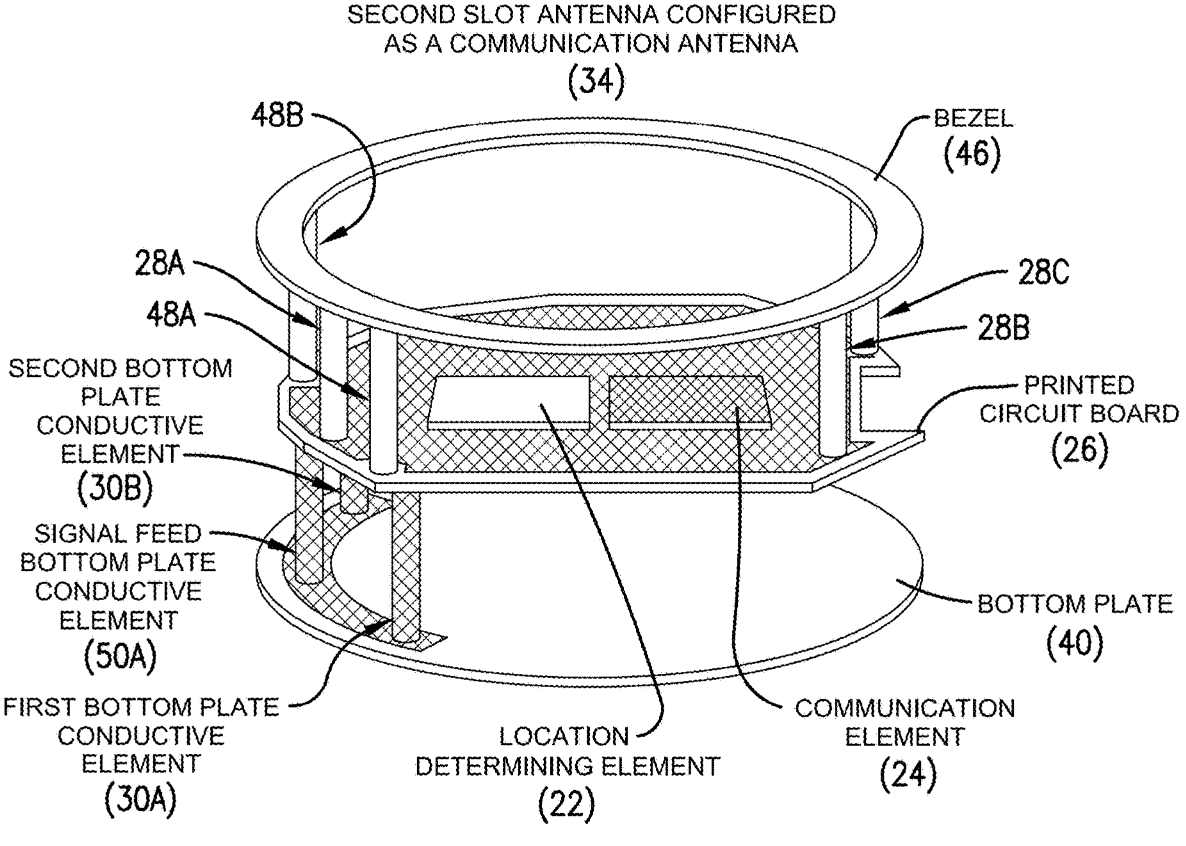
FIG. 8B is a simplified schematic representation with highlights of a portion of the bottom plate, the bottom plate conductive elements, and the printed circuit board which form the second slot antenna of the electronic device of FIG. 1.
Figure 8C:
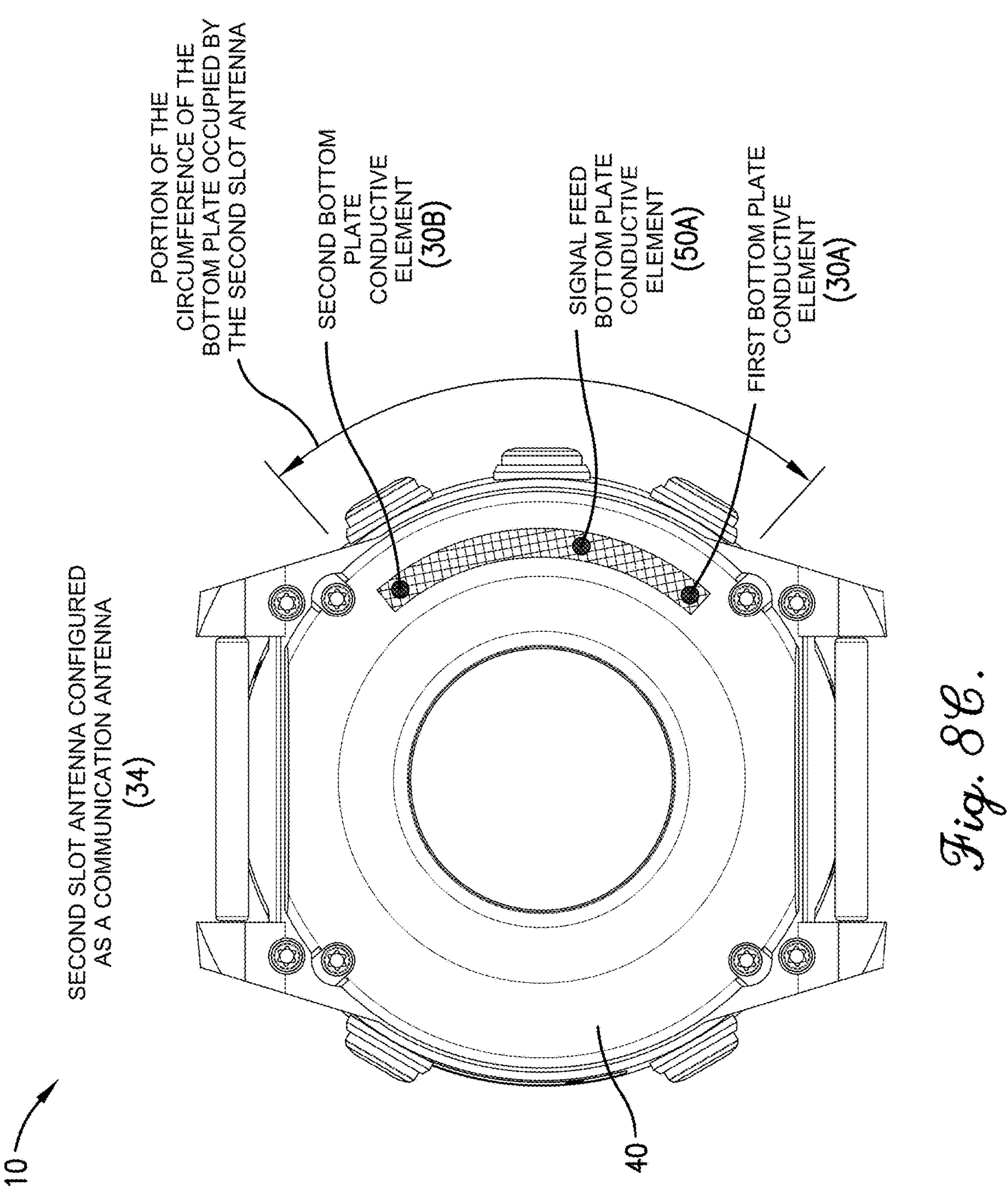
FIG. 8C is a bottom plan view of the electronic device of FIG. 1 illustrating a location of a plurality of bottom plate conductive elements along with a portion of a circumference of the bottom plate occupied by the second slot antenna.

Referring to FIGS. 8A, 8B, and 8C, the second slot antenna 34 may be configured as a communication wireless signal antenna, which transmits and receives wireless communication signals utilizing Bluetooth™ and/or Wi-Fi having frequencies of approximately 2.4 GHz and frequencies commonly associated with cellular protocols. The structure of the second slot antenna 34 is formed by the following components of the electronic device 10. The bottom conductor of the second slot antenna 34 is formed by one of the full or partial signal or ground planes of the printed circuit board 26. The left side conductor of the second slot antenna 34 is formed by the first bottom plate conductive element 30A, which provides an electrical ground or common electronic signal path for the second slot antenna 34 only. The right side conductor of the second slot antenna 34 is formed by the second bottom plate conductive element 30B, which provides an electrical ground or common electronic signal path for the second slot antenna 34 only. The upper conductor of the second slot antenna 34 is formed by a first portion of the circumference of the bottom plate 40, as shown in FIGS. 8B and 8C. As shown by the polarity markings provided in FIGS. 6 and 8A, the "upper" conductor for the second slot antenna 34, which is positioned below the printed circuit board 26, is formed by the bottom plate 40, which is functionally equivalent to the bezel 46 for the first slot antenna 32 as it corresponds to the positive (+) polarity of the signal source shown in the general form of a slot antenna depicted in FIG. 5. Similarly, the "lower" conductor for the second slot antenna 34 remains the printed circuit board 26, which corresponds to the negative (−) polarity of the signal source shown in the general form of a slot antenna depicted in FIG. 5. The electronic signal transmitter and receiver is the communication element 24, which is electrically connected to the structure of the second slot antenna 34 through the one or more signal traces of the printed circuit board 26 and a signal feed bottom plate conductive element 50A, which provides a signal feed path for the communication electronic signal. Through the signal feed bottom plate conductive element 50A and various signal traces or conductive planes on the printed circuit board 26, the communication electronic signal is electronically communicated between the second slot antenna 34 and the communication element 24. The portions of the bottom plate 40 and the printed circuit board 26 that are associated with the second slot antenna 34 are shown in crosshatch in FIGS. 8B and 8C.

Figure 9A:
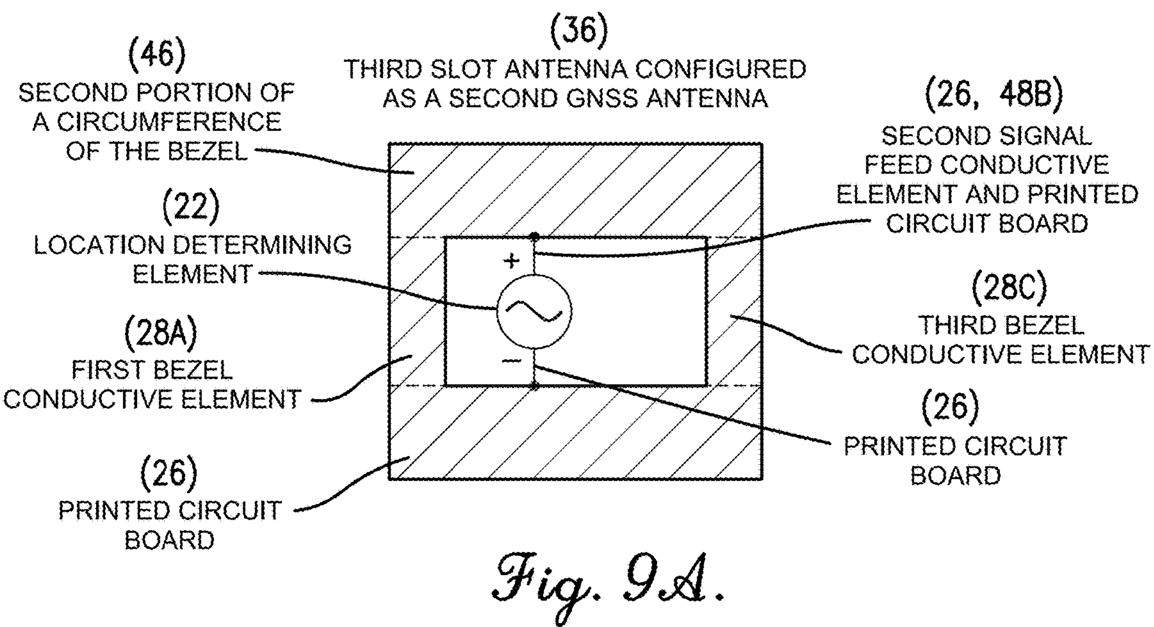
FIG. 9A is a schematic diagram of the components of a third slot antenna configured as a second GNSS antenna of the electronic device of FIG. 1.
Figure 9B:
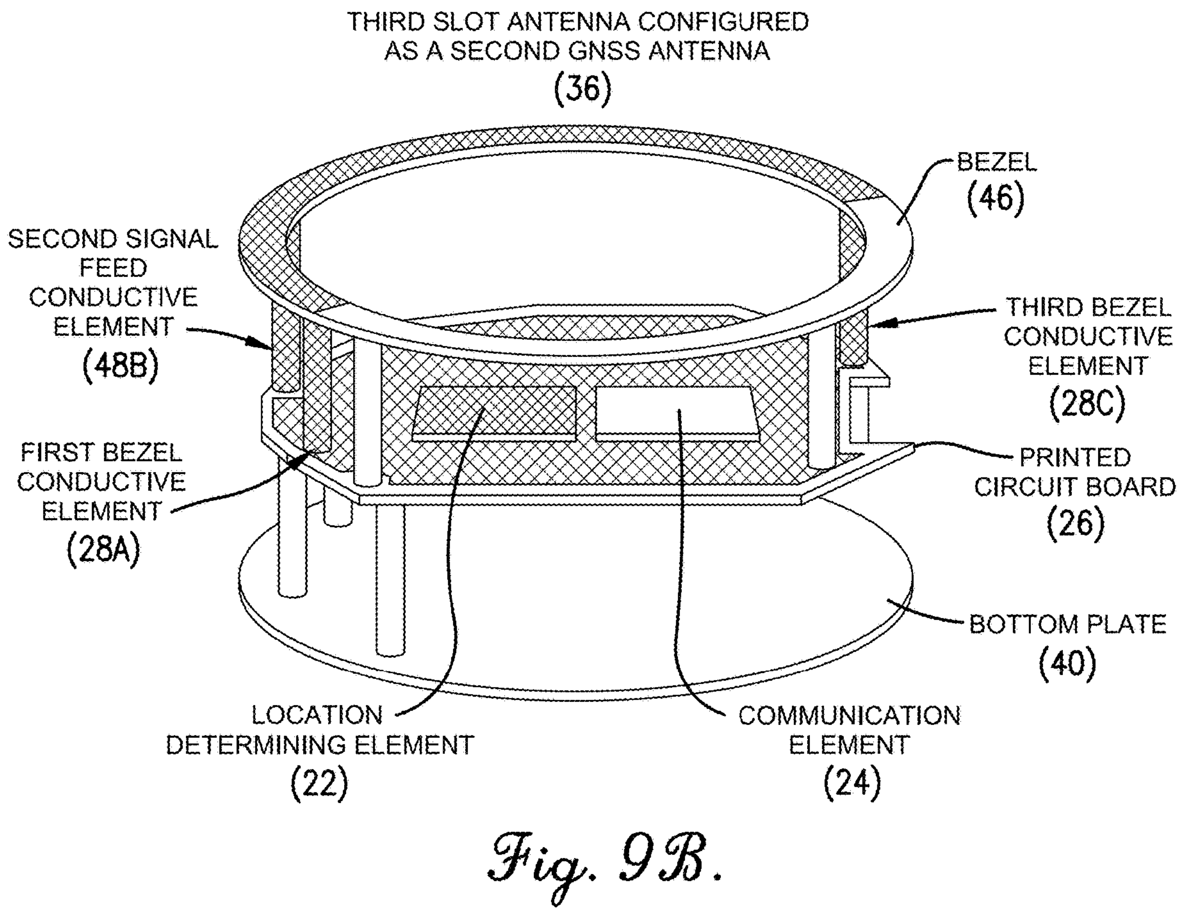
FIG. 9B is a simplified schematic representation with highlights of a second portion of the bezel, the bezel conductive elements, and the printed circuit board which form the third slot antenna of the electronic device of FIG. 1.
Figure 9C:
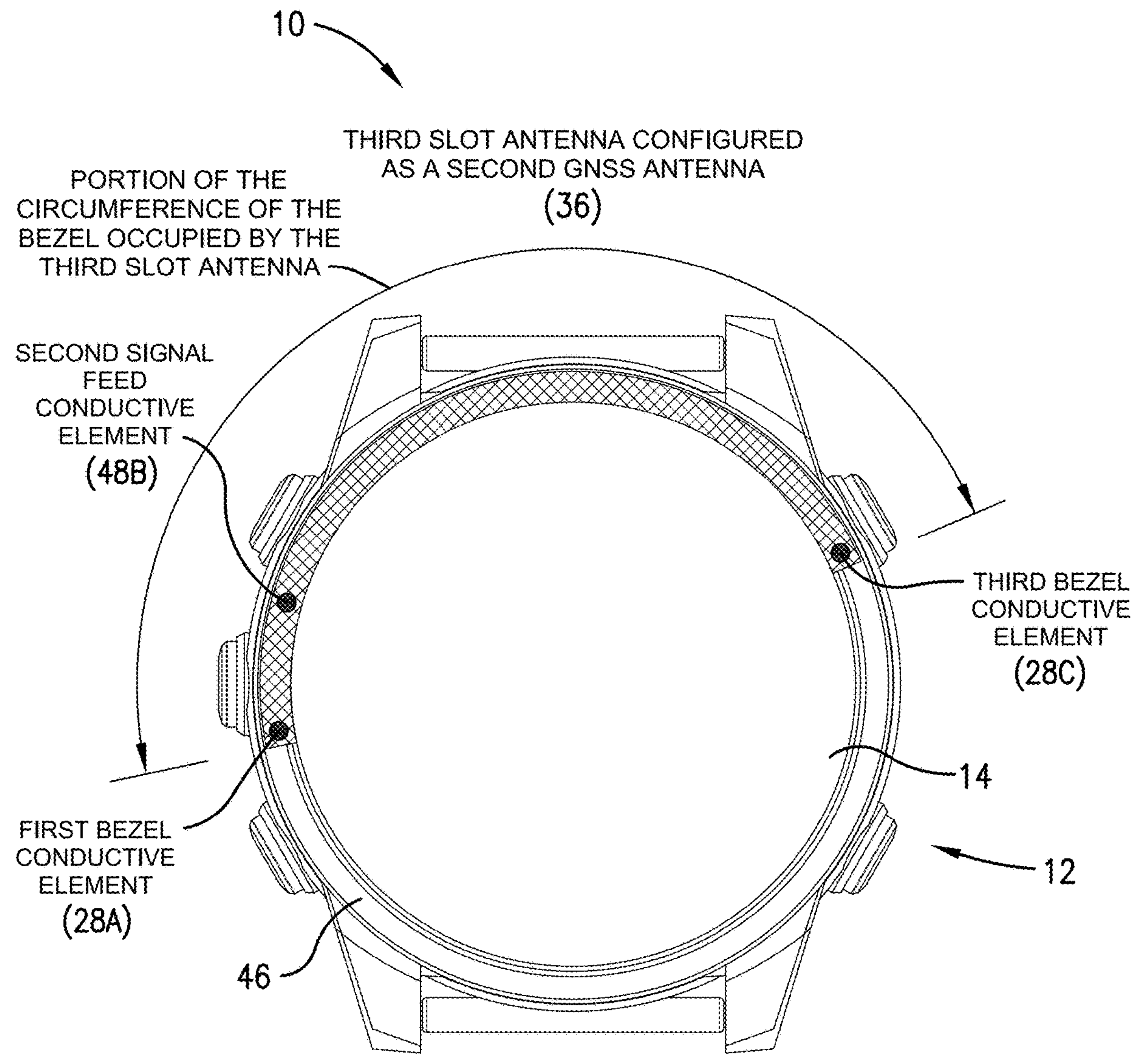
FIG. 9C is a top plan view of the electronic device of FIG. 1 illustrating a location of a plurality of bezel conductive elements along with the second portion of the bezel occupied by the third slot antenna.

Referring to FIGS. 9A, 9B, and 9C, the third slot antenna 36 may be configured as a second GNSS wireless signal antenna, which receives wireless location signals in the GPS L5 band of frequencies, centered at approximately 1175 MHz. The structure of the third slot antenna 36 is formed by the following components of the electronic device 10. The upper conductor of the third slot antenna 36 is formed by a second portion of the circumference of the bezel 46, as shown in FIGS. 9B and 9C, extending in a clockwise (CW) direction from approximately 8:00 to 2:00. The left side conductor of the third slot antenna 36 is formed by the first bezel conductive element 28A, which provides an electrical ground or common electronic signal path for the first slot antenna 32 and the third slot antenna 36. The right side conductor of the third slot antenna 36 is formed by a third bezel conductive element 28C, which provides an electrical ground or common electronic signal path for the third slot antenna 36 only. The lower conductor of the third slot antenna 36 is formed by one of the full or partial signal or ground planes of the printed circuit board 26. The electronic signal receiver is the location determining element 22, which is electrically connected to the structure of the third slot antenna 36 through the one or more signal traces of the printed circuit board 26 and a second signal feed conductive element 48B, which provides a signal feed path for the second location electronic signal. Through the second signal feed conductive element 48B and various signal traces or conductive planes on the printed circuit board 26, the second location electronic signal is electronically communicated between the third slot antenna 36 and the location determining element 22. The portions of the bezel 46 and the printed circuit board 26 that are associated with the third slot antenna 36 are shown in crosshatch in FIGS. 9B and 9C.

The implementation of the antennas 32, 34, 36 as depicted in FIGS. 7B, 8B, and 9B is merely exemplary. The positioning of the bezel conductive elements 28A, 28B, 28C and signal feed conductive elements 48A, 48B along the circumference of the bezel 46 and the positioning of the bottom plate conductive elements 30A, 30B and signal feed bottom plate conductive element 50A along the circumference of the bottom plate 40 are dependent on, and vary according to, the spacing between the printed circuit board 26 and the bezel 46 and the spacing between the printed circuit board 26 and the bottom plate 40. Typically, the spacing between the bottom plate 40 and the bezel 46 is fixed. However, it is possible for the printed circuit board 26 to be repositioned vertically relative to the bottom plate 40 and the bezel 46. In such a situation, the positioning of the bezel conductive elements 28A, 28B, 28C along the circumference of the bezel 46 and the positioning of the bottom plate conductive elements 30A, 30B along the circumference of the bottom plate 40 would change in order to maintain the same perimeter of the slot opening of each slot antenna 32, 34, 36. For example, if the printed circuit board 26 were to be positioned closer to the bezel 46 and farther from the bottom plate 40, then the height of the first slot antenna 32 and the third slot antenna 36 would decrease, and the height of the second slot antenna 34 would increase. Accordingly, the bezel conductive elements 28A, 28B that form the left and right side conductors of the first slot antenna 32 would be moved farther apart along the circumference of the bezel 46 in order to increase the width of the slot opening of the first slot antenna 32. And, the bezel conductive elements 28A, 28C that form the left and right side conductors of the third slot antenna 36 would be moved farther apart along the circumference of the bezel 46 in order to increase the width of the slot opening of the third slot antenna 36. In addition, the bottom plate conductive elements 30A, 30B that form the left and right side conductors of the second slot antenna 34 would be moved closer together along the circumference of the bottom plate 40 in order to decrease the width of the slot opening of the second slot antenna 34.

Accordingly, in embodiments, the wrist-worn electronic device 10 may include a first slot antenna 32 configured to receive location wireless signals in the global positioning system (GPS) L1 band, a second slot antenna 34 configured to transmit and receive communication wireless signals in the 2.4 gigahertz (GHz) frequency band or the 5 GHz frequency band, and a third slot antenna 36 configured to receive location wireless signals in the GPS L5 band.

It is to be understood that two or more slot antennas may be positioned in the upper portion of the housing and two or more slot antennas may be positioned in the lower portion of housing 12. For example, in embodiments, the wrist-worn electronic device 10 may further include a fourth slot antenna in the lower portion of the side wall configured to transmit and receive communication wireless signals in the 2.4 gigahertz (GHz) frequency band or the 5 GHz frequency band. In embodiments, the wrist-worn electronic device 10 may include a first slot antenna 32 in the upper portion of the side wall configured to receive location wireless signals in the global positioning system (GPS) L1 band, a second slot antenna 34 in the lower portion of the side wall configured to transmit and receive communication wireless signals in the 2.4 gigahertz (GHz) frequency band, a third slot antenna 36 in the upper portion of the side wall configured to receive location wireless signals in the GPS L5 band, a fourth slot antenna in the lower portion of the side wall configured to transmit and receive communication wireless signals in the 5 gigahertz (GHz) frequency band.

In embodiments, a tuning network 52 may be incorporated to extend or reduce the effective length of an aperture associated with one or more of the first slot antenna 32, the second slot antenna 34, the third slot antenna 36 or the fourth slot antenna, as needed, in view of the circumference of the housing 12, the circumference of the printed circuit board 26 and the height of the plurality of bezel conductive elements 28 and the plurality of bottom plate conductive elements 30. The tuning network 52 (or a tuning point) may be incorporated to extend or reduce the effective length of an aperture associated with one or more of the first slot antenna 32, the second slot antenna 34 or the third slot antenna 36. For instance, a tuning network 52 may be used for the third slot antenna 36 that is utilized to receive location wireless signals for the L5 GPS band, which has frequencies below the L1 GPS band, to achieve a longer effective length for the third slot antenna 36 than the physical perimeter of the third slot antenna 36. In such embodiments, if the third slot antenna 36 is being extended in effective length, the tuning network 52 may be a tuning element (e.g., an inductor, a capacitor, inductor capacitor (LC) components, etc.) positioned at a location between the printed circuit board 26 and the bezel 46 at either the first bezel conductive element 28A or the third bezel conductive element 28C. Similarly, in embodiments in which the third slot antenna 36 is positioned in the lower portion of housing 12 and is being extended in effective length, the tuning network 52 may be a capacitor positioned at a location between the printed circuit board 26 and the bottom plate 40 at either the first bottom plate conductive element 30A or the second bottom plate conductive element 30B. In other embodiments, the tuning network 52 (containing capacitor and/or inductor (LC) components) is located on the printed circuit board 26 and electrically couples with a location on a lower surface of the bezel 46 if the first slot antenna 32 or the third slot antenna 36 positioned in the upper portion of housing 12 is being extended in effective length or the tuning network 52 electrically couples with a location on an upper surface of the bottom plate 40 if the second slot antenna 34 positioned in the lower portion of housing 12 is being extended in effective length).

Figure 10A:
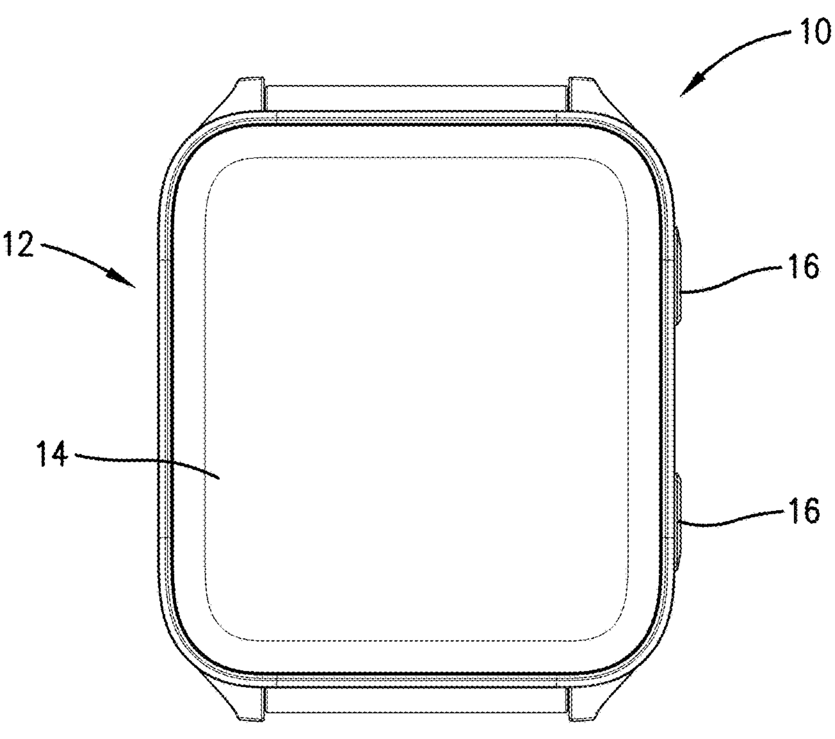
FIG. 10A is a top plan view of an electronic device, constructed in accordance with various embodiments of the current technology, including one or more slot antennas in a lower horizontal plane.

Referring to FIGS. 10A-11C, additional embodiments of the wrist-worn electronic device 10 are illustrated in which one or more slot antennas 32, 34, 36 are all positioned in a lower horizontal plane of the housing 12. Similar to the electronic device 10 of FIGS. 1-3 described above, the wrist-worn electronic device 10 described in reference to FIG. 10A is broadly comprised of the housing 12, the display 14, the user interface 16 as well as other components illustrated in FIG. 4, such as the memory element 18, the processor 20, the location determining element 22, the communication element 24, the printed circuit board 26.

Figure 10B:
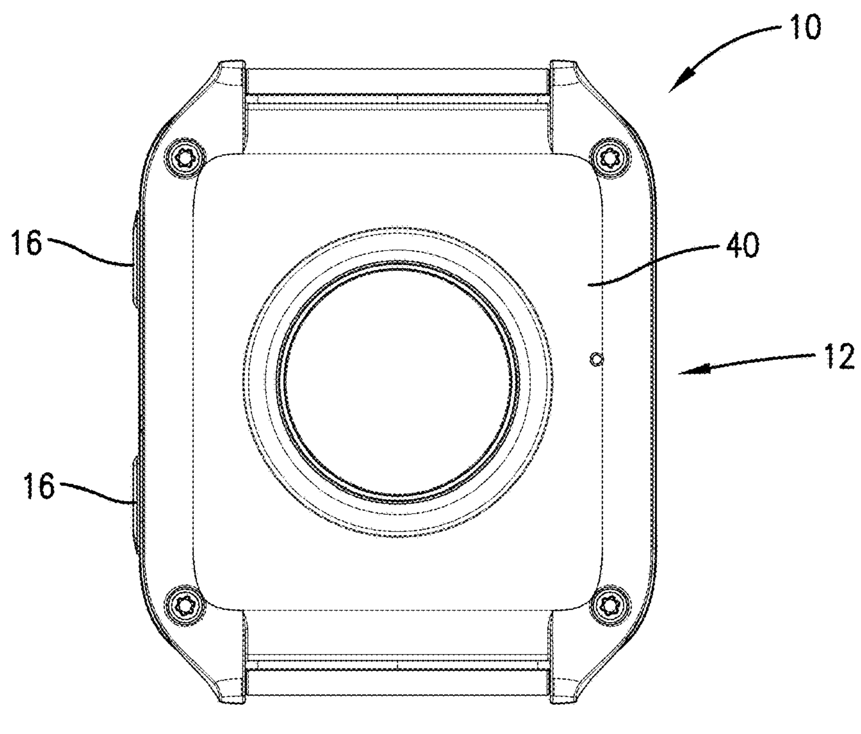
FIG. 10B is a bottom plan view of the electronic device of FIG. 10A.
Figure 11A:
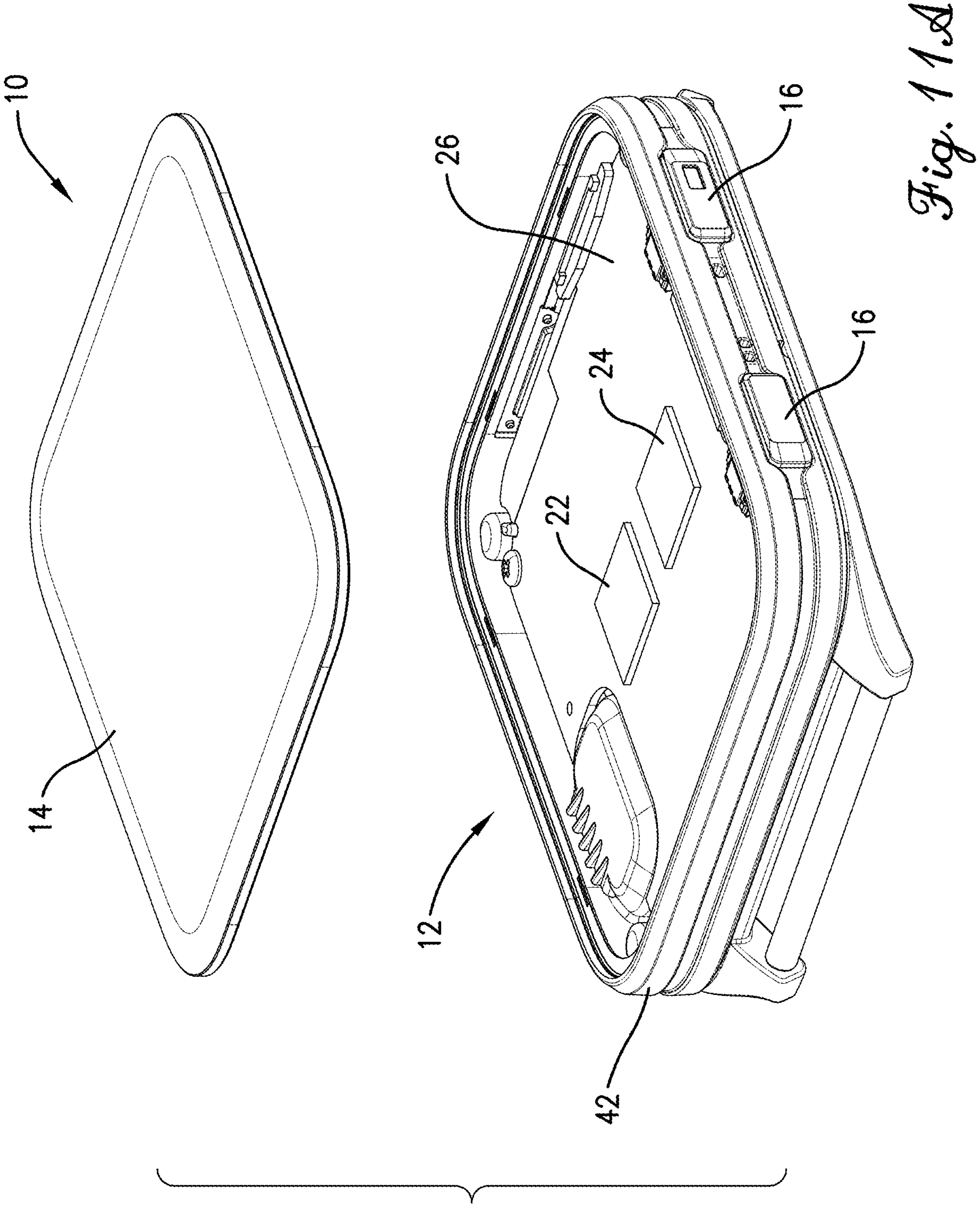
FIG. 11A is an upper perspective exploded view of the electronic device of FIG. 10A with a display removed from other portions of the housing to reveal an internal cavity including a printed circuit board, a location determining element and a communication element.

As seen in FIGS. 10B and 11A, the electronic device 10 may have a substantially rectangular housing 12 containing within its inner cavity a substantially rectangular printed circuit board 26. The housing 12 includes the bottom plate 40, the side wall 42 and the plurality of bottom plate conductive elements 30, which partially form at least the first slot antenna 32 in combination with a portion of the bottom plate 40 and a portion of the printed circuit board 26. The housing 12 attaches to the wrist band 38, a strap, or other attachment mechanisms that secure the wrist-worn electronic device 10 to the user's wrist.

Figure 11B:
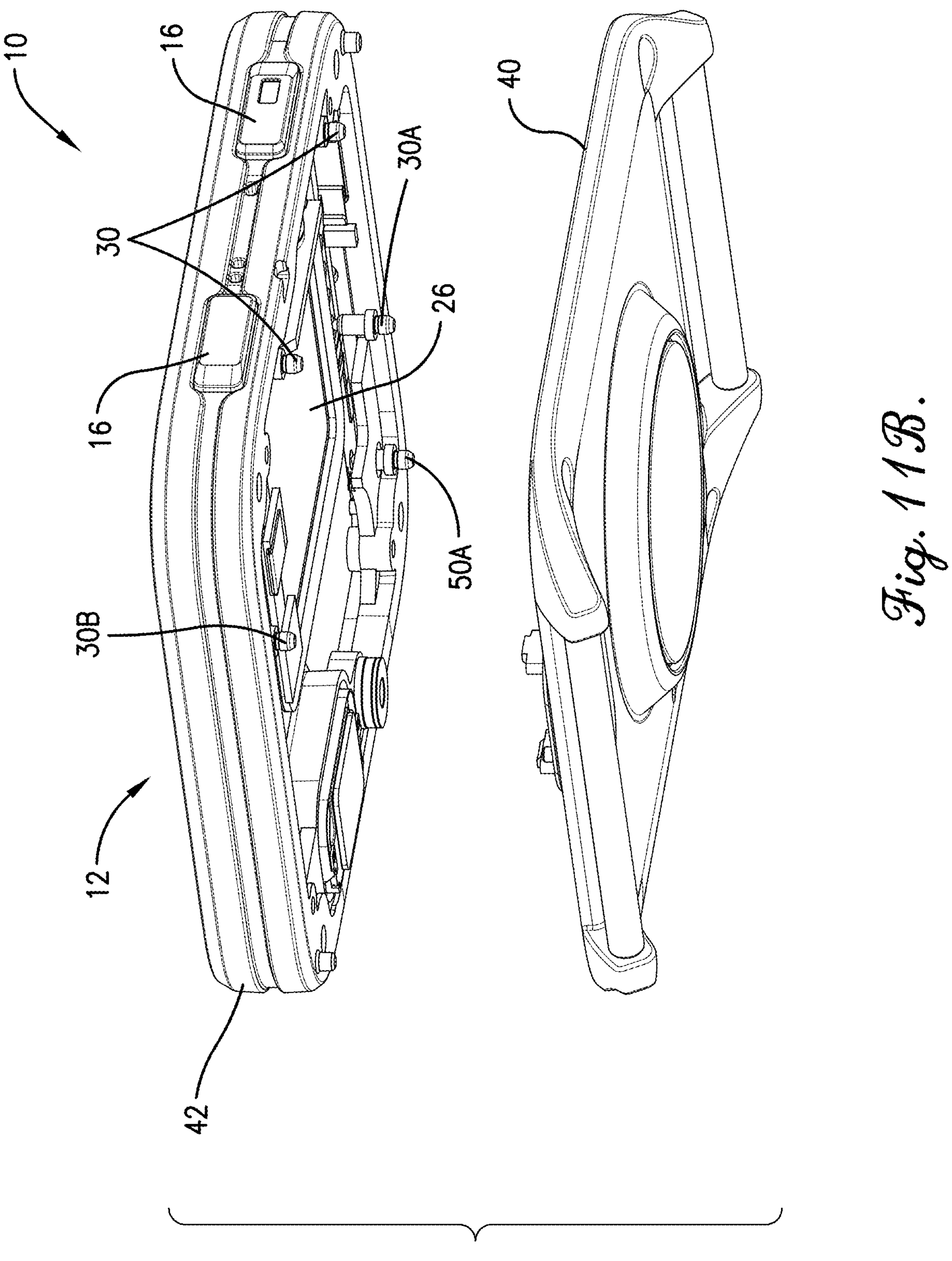
FIG. 11B is a lower perspective exploded view of the electronic device of FIG. 10A with a bottom plate removed from other portions of the housing to reveal the internal cavity including a plurality of bottom plate conductive elements associated with a first slot antenna.

Referring to FIG. 11B, in embodiments, the wrist-worn electronic device 10 depicted in FIG. 10A may be configured to include one slot antenna, the first slot antenna 32, in a lower portion of the housing 12. The first slot antenna 32 is positioned in a lower horizontal plane of the wrist-worn electronic device 10 and configured to receive a first frequency band of a GNSS signal, which in this exemplary embodiment is the GPS L1 band that has a center frequency of 1575.42 MHz. The first portion of the circumference of the bottom plate 40 associated with the first slot antenna 32 (from the first bottom plate conductive element 30A to the second bottom plate conductive element 30B, in a counter-clockwise direction) and the corresponding portion (perimeter) of the printed circuit board 26 between the bottom plate conductive elements 30A, 30B may each have a width that corresponds to one-half of the wavelength of the center frequency of the GPS L1 band of approximately 1575 MHz. A signal feed bottom plate conductive element 50A provides a signal feed path for the location electronic signal.

Two or more bottom plate conductive elements 30 are electrically coupled with the electrical ground of the printed circuit board 26 and positioned in a second portion of the circumference of the bottom plate 40 from the first bottom plate conductive element 30A to the second bottom plate conductive element 30B, in a clockwise direction. Although only two electrically grounded bottom plate conductive elements 30 are depicted in FIG. 11B to electrically isolate the first slot antenna 32 from other portions of the housing 12, it is to be understood that additional electrically grounded bottom plate conductive elements 30 may be positioned in the second portion of the circumference of the bottom plate 40 and the printed circuit board 26.

Figure 12A:
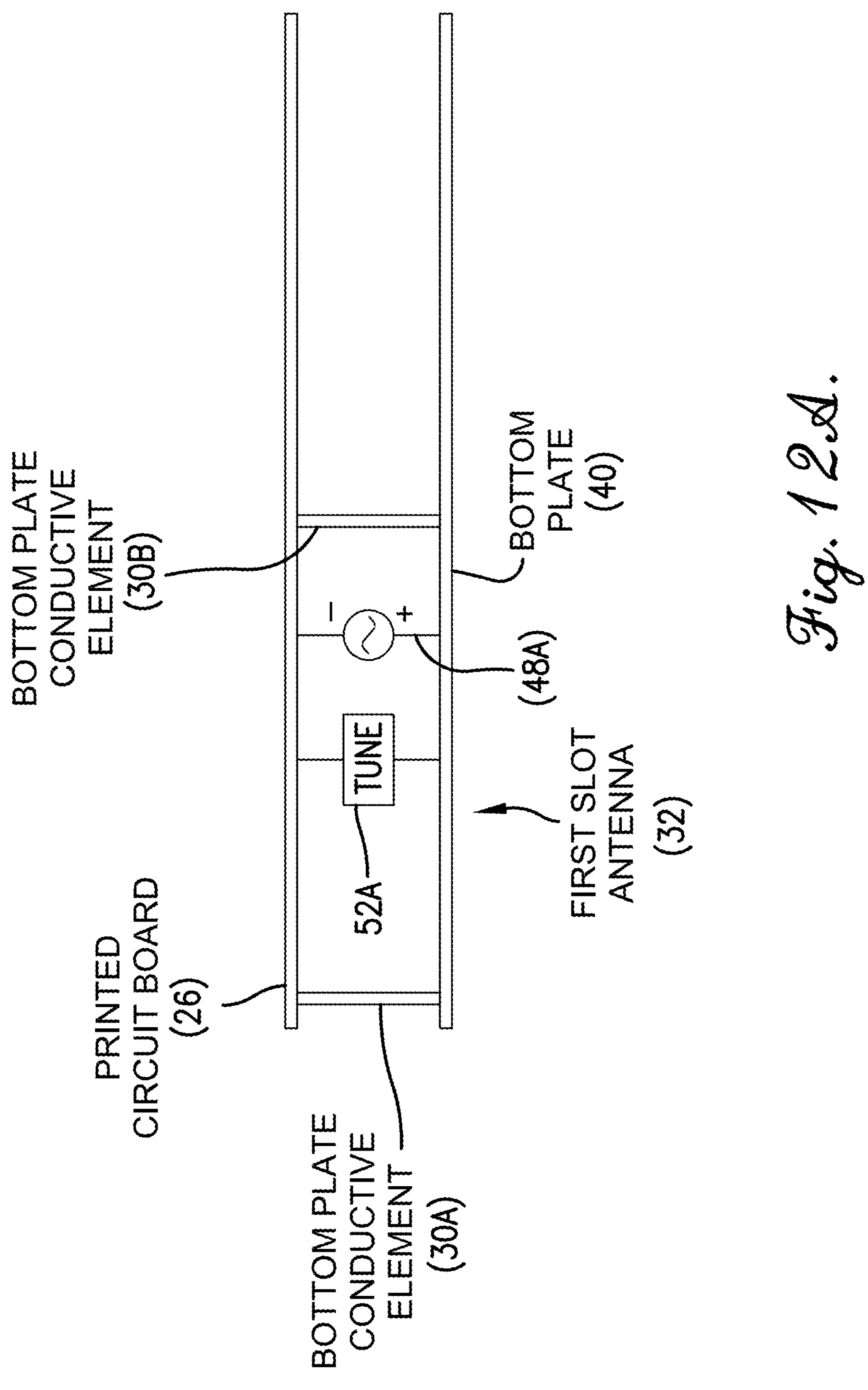
FIG. 12A is a schematic diagram of the first slot antenna implemented in the electronic device of FIG. 11B in the lower horizontal plane.
Figure 13A:
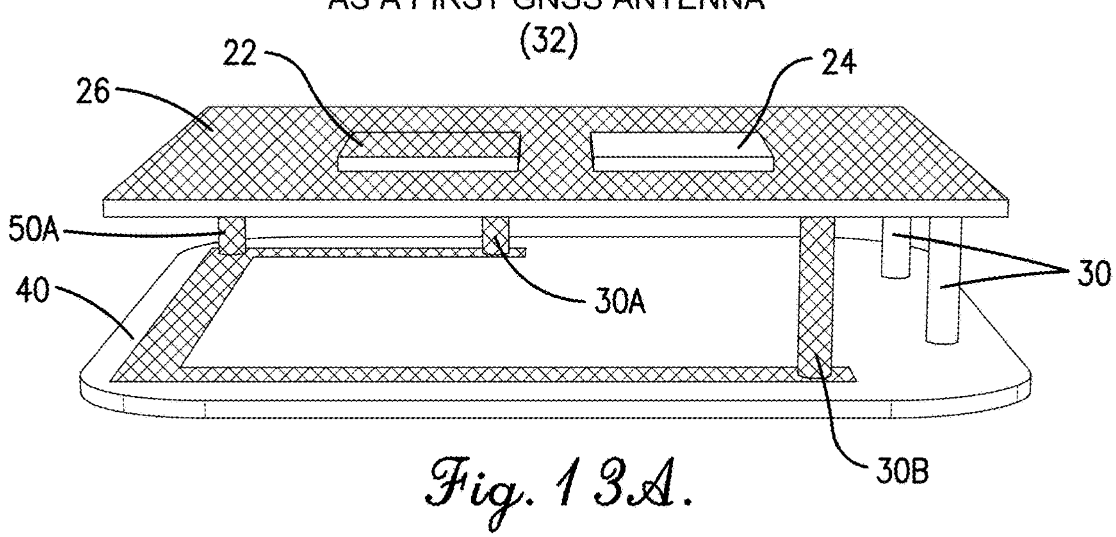
FIG. 13A is a simplified schematic representation of the electronic device of FIG. 11B with highlights of a portion of the bottom plate, the bottom plate conductive elements, and the printed circuit board which form the first slot antenna.
Figure 13B:
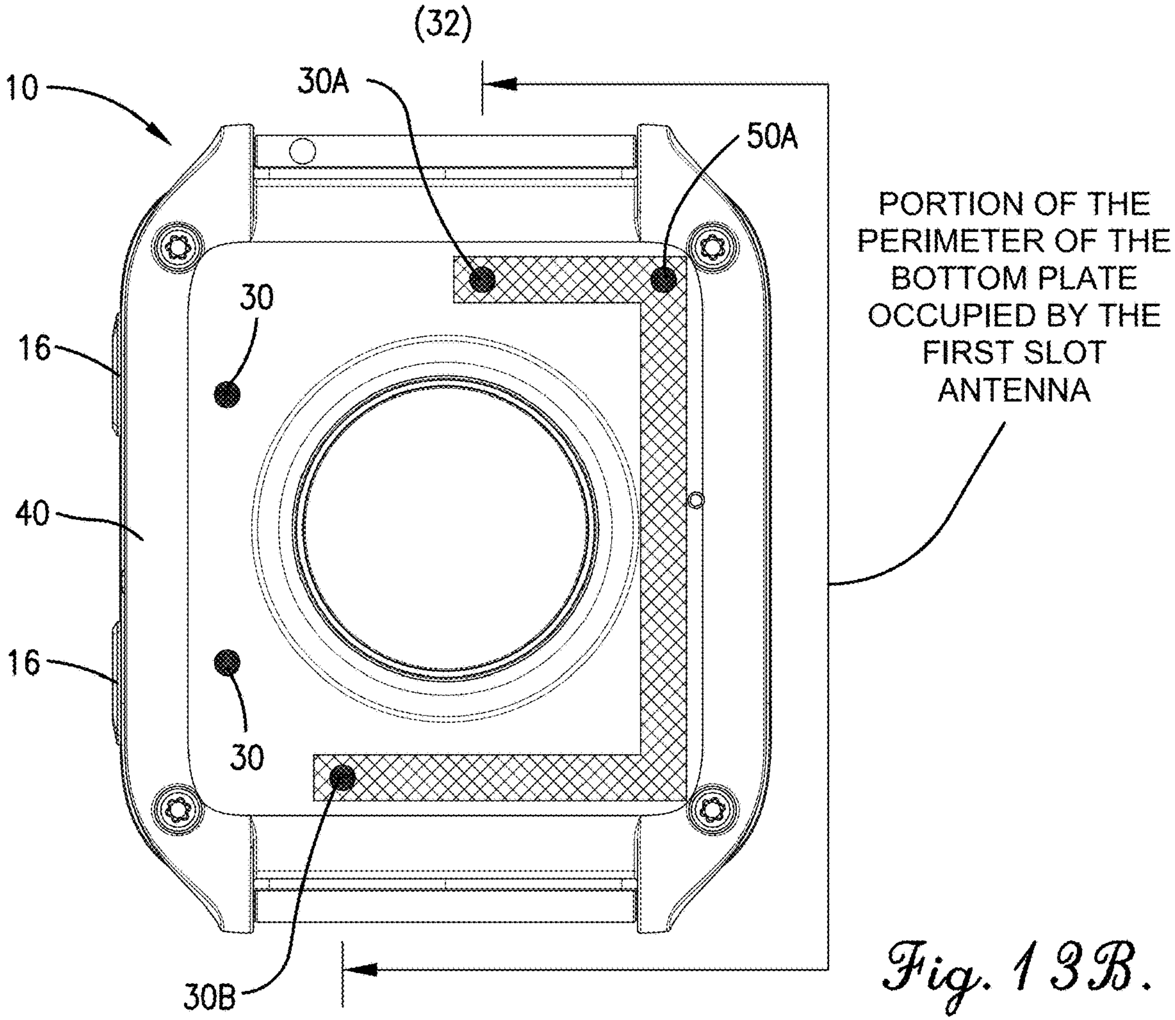
FIG. 13B is a bottom plan view of the electronic device of FIG. 11B illustrating a location of a plurality of bottom plate conductive elements along with a portion of a circumference of the bottom plate occupied by the first slot antenna.

In such embodiments related to the first slot antenna 32 being positioned in a lower portion of housing 12, the structure of the first slot antenna 32 is formed by the following components of the electronic device 10. As shown in FIG. 12A, the lower conductor of the first slot antenna 32 is formed by one of the full or partial ground planes of the printed circuit board 26. The left side conductor of the first slot antenna 32 is formed by the first bottom plate conductive element 30A, which provides an electrical ground or common electronic signal path for the first slot antenna 32. The right side conductor of the first slot antenna 32 is formed by the second bottom plate conductive element 30B, which provides an electrical ground or common electronic signal path for the first slot antenna 32. The upper conductor of the first slot antenna 32 is formed by a first portion of the circumference of the bottom plate 40, as shown in FIGS. 13A and 13B. Similar to the embodiment depicted in FIG. 8A, as shown by the polarity markings provided in FIG. 12A, the "upper" conductor for the first slot antenna 32, which is positioned below the printed circuit board 26, is formed by the bottom plate 40. Similarly, the "lower" conductor for the first slot antenna 32 remains the printed circuit board 26, which corresponds to the negative (−) polarity of the signal source shown in the general form of a slot antenna depicted in FIG. 5. In this exemplary embodiment, the electronic signal receiver is the location determining element 22, which is electrically connected to the structure of the first slot antenna 32 through the one or more signal traces of the printed circuit board 26 and the signal feed bottom plate conductive element 50A, which provides a signal feed path for the first location electronic signal. Through the signal feed bottom plate conductive element 50A and various signal traces or conductive planes on the printed circuit board 26, the first location electronic signal is electronically communicated between the first slot antenna 32 and the location determining element 22. The first portion of the bottom plate 40 and the printed circuit board 26 that are associated with the first slot antenna 32 are shown in crosshatch in FIGS. 13A and 13B. This utilization of the various components of the electronic device 10 to form the structures of the first slot antenna 32 allows for a single slot antenna to be positioned in the lower portion and a lower horizontal plane of housing 12, as shown in FIG. 12A. As discussed above, in embodiments, a tuning network 52 may be incorporated to extend or reduce the effective length of an aperture associated with the first slot antenna 32, as needed, in view of the circumference of the housing 12, the circumference of the printed circuit board 26 and the height of the plurality of bottom plate conductive elements 30. It is to be understood that, in some embodiments, the first slot antenna 32 may instead be utilized to transmit and receive wireless communication signals utilizing Bluetooth™ and/or Wi-Fi having frequencies of approximately 2.4 GHz and frequencies commonly associated with cellular protocols. In such embodiments, the first slot antenna 32 is communicatively coupled with the communication element 24. Similarly, in embodiments, the first slot antenna 32 may instead be utilized to receive a second frequency band of a GNSS signal, which in this exemplary embodiment is the GPS L5 band that has a center frequency of 1176.45 MHz. In such embodiments, the first slot antenna 32 is communicatively coupled with the location determining element 22.

Figure 11C:
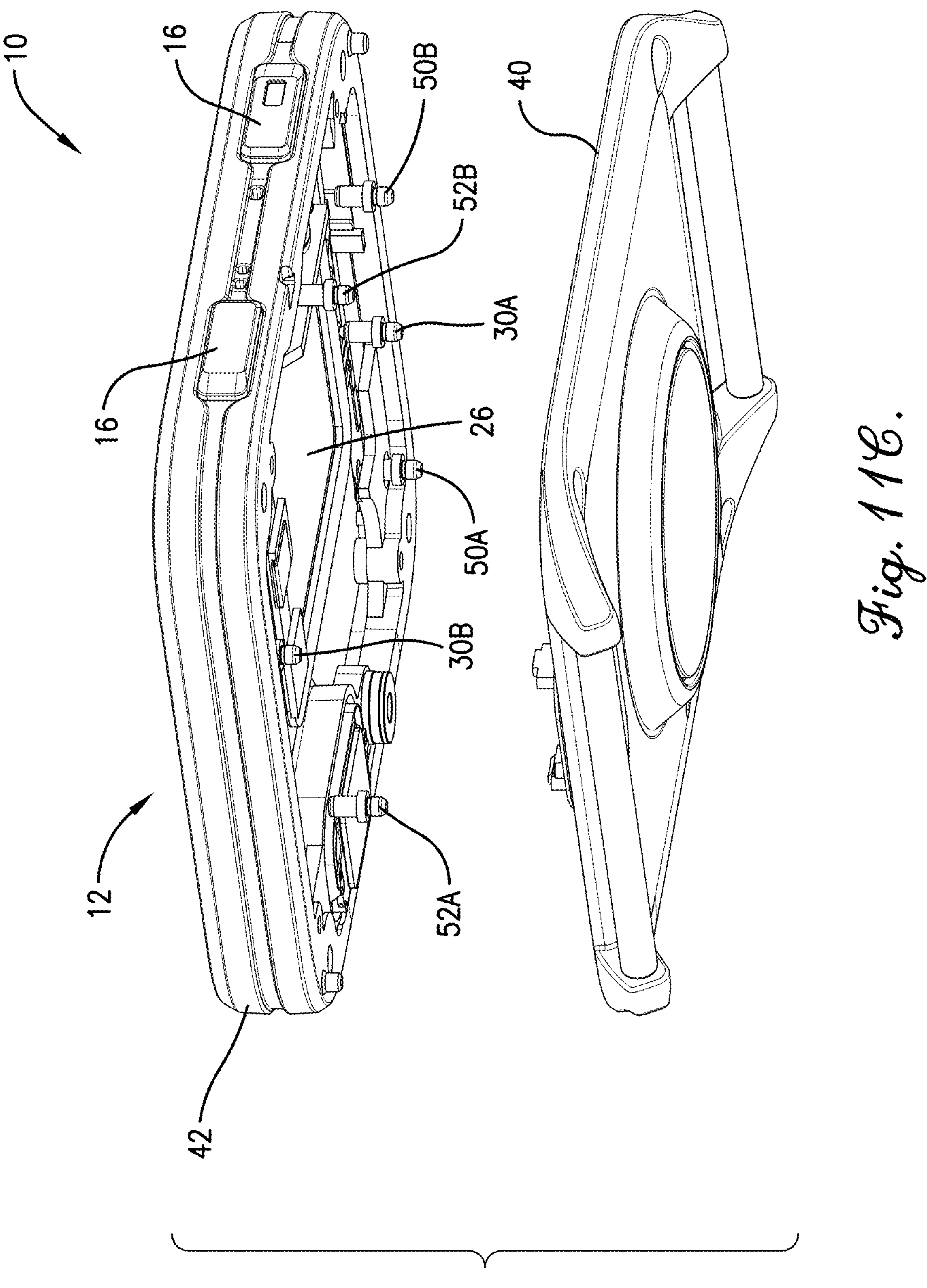
FIG. 11C is a lower perspective exploded view of the electronic device of FIG. 10A with a bottom plate removed from other portions of the housing to reveal the internal cavity including a plurality of bottom plate conductive elements associated a plurality of slot antennas.

Referring to FIG. 11C, in embodiments, the wrist-worn electronic device 10 depicted in FIG. 10A may be configured to include a plurality of slot antennas, the first slot antenna 32 and the second antenna 34, in a lower portion of the housing 12. The first slot antenna 32 is positioned in a lower horizontal plane of the wrist-worn electronic device 10 and configured to receive a first frequency band of a GNSS signal, which in this exemplary embodiment is the GPS L1 band that has a center frequency of 1575.42 MHz. Similarly, the second slot antenna 34 is positioned in a lower horizontal plane of the wrist-worn electronic device 10 and configured to receive a second frequency band of a GNSS signal, which in this exemplary embodiment is the GPS L5 band that has a center frequency of 1176.45 MHz. The first portion of the circumference of the bottom plate 40 (from the first bottom plate conductive element 30A to the second bottom plate conductive element 30B, in a counterclockwise direction) and the corresponding portion (perimeter) of the printed circuit board 26 between the bottom plate conductive elements 30A, 30B may each have a width that corresponds to one-half of the wavelength of the center frequency of the GPS L1 band of approximately 1575 MHz. A first signal feed bottom plate conductive element 50A provides a signal feed path for the first location electronic signal. Similarly, the second portion of the circumference of the bottom plate 40 (from the first bottom plate conductive element 30A to the second bottom plate conductive element 30B, in a clockwise direction) and the corresponding portion (perimeter) of the printed circuit board 26 between the bottom plate conductive elements 30A, 30B may each have a width that corresponds to one-half of the wavelength of the center frequency of the GPS L5 band of approximately 1175 MHz. A second signal feed bottom plate conductive element 50B provides a signal feed path for the second location electronic signal.

Figure 12B:
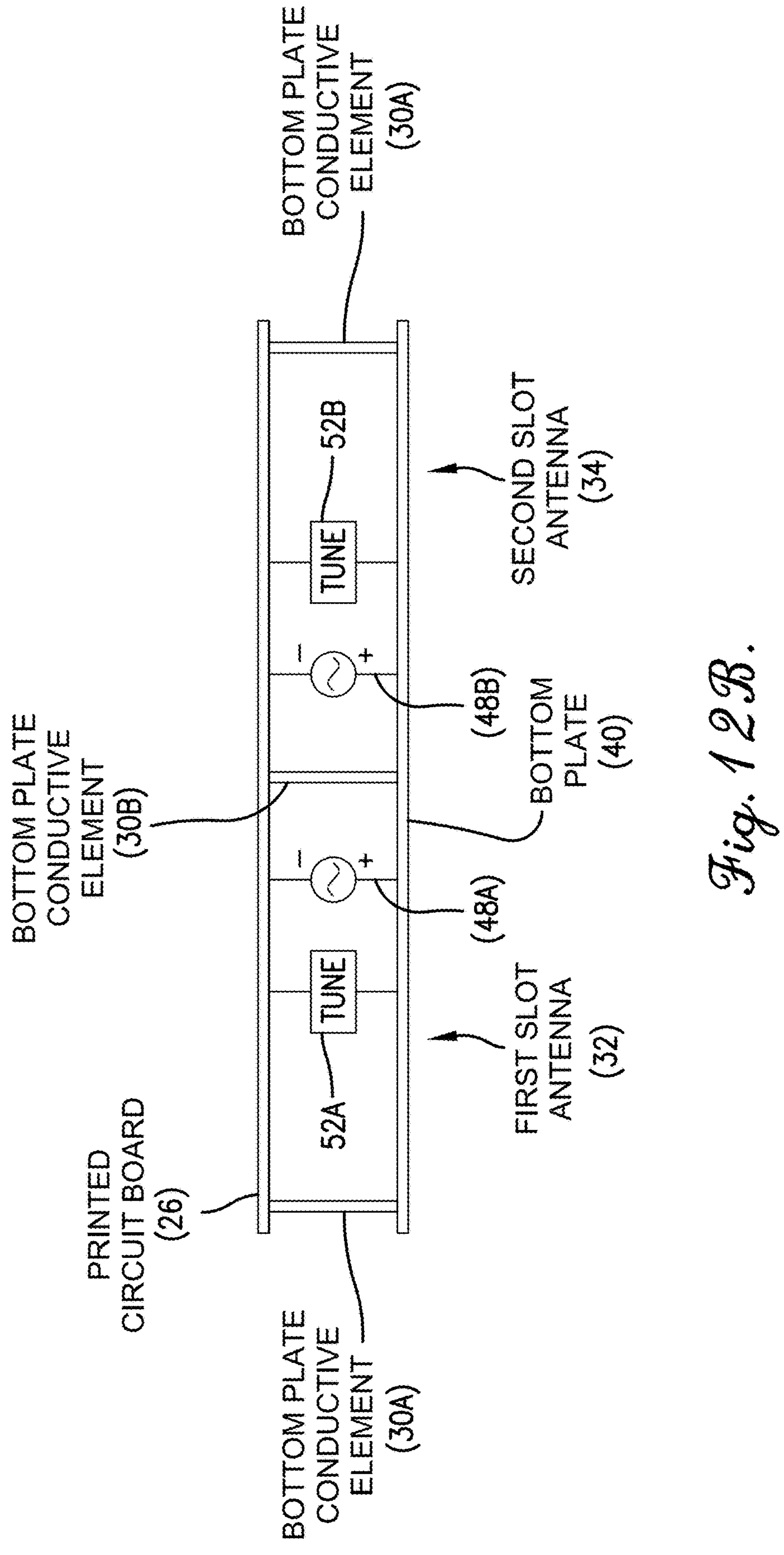
FIG. 12B is a schematic diagram of the plurality of slot antennas implemented in the electronic device of FIG. 11C in the lower horizontal plane.
Figure 14A:
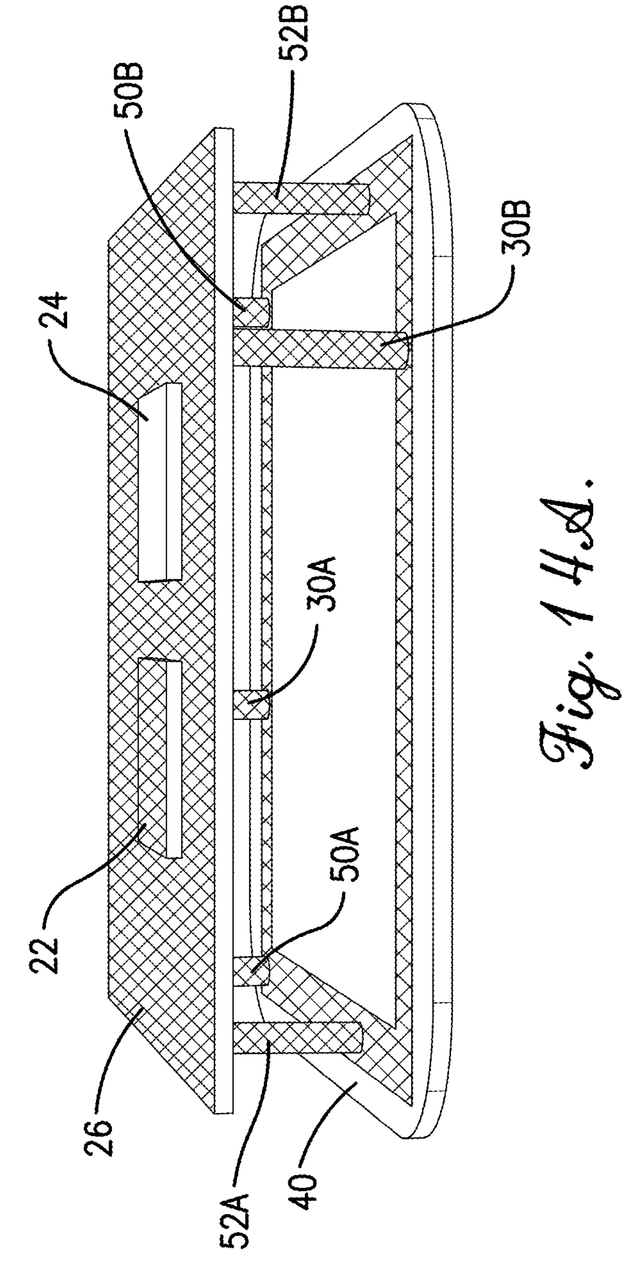
FIG. 14A is a simplified schematic representation of the electronic device of FIG. 11C with highlights of a portion of the bottom plate, the bottom plate conductive elements, and the printed circuit board which form the plurality of slot antennas.

In such embodiments related to the first slot antenna 32 and the second slot antenna 34 both being positioned in a lower portion of housing 12, the structure of the first slot antenna 32 and the second slot antenna 34 are formed by the following components of the electronic device 10. As shown in FIG. 12B, in this embodiment, the lower conductor of the first slot antenna 32 and the second slot antenna 34 is formed by one of the full or partial ground planes of the printed circuit board 26. The upper conductor of the first slot antenna 32 is formed by a first portion of the circumference of the bottom plate 40, as shown in FIGS. 14A and 14B.

In some embodiments, the combined lengths of the first slot antenna 32 and the second slot antenna 34 are substantially equal to the circumference of the bottom plate 40 and the circumference of the printed circuit board 26. In such embodiments, a first portion of the circumference of each of the bottom plate 40 and the circumference of the printed circuit board 26 is associated with the first slot antenna 32 and a second portion of the circumference of each of the bottom plate 40 and the circumference of the printed circuit board 26 is associated with the second slot antenna 34. For example, as shown in FIG. 12B, the left side conductor of the first slot antenna 32 is formed by the first bottom plate conductive element 30A, which provides an electrical ground or common electronic signal path for the first slot antenna 32, and the right side conductor of the first slot antenna 32 is formed by the second bottom plate conductive element 30B, which provides an electrical ground or common electronic signal path for the first slot antenna 32. The left side conductor of the second slot antenna 34 is formed by the second bottom plate conductive element 30B, which provides an electrical ground or common electronic signal path for the second slot antenna 34. The right side conductor of the second slot antenna 34 is formed by the first bottom plate conductive element 30A, which provides an electrical ground or common electronic signal path for the second slot antenna 34.

In other embodiments, the first portion of the circumference of each of the bottom plate 40 and the circumference of the printed circuit board 26 associated with the first slot antenna 32 is separated from the second portion of the circumference of each of the bottom plate 40 and the circumference of the printed circuit board 26 associated with the second slot antenna 34. In such embodiments, additional bottom plate conductive elements 30 are utilized to form a left side conductor or right side conductor for the first slot antenna 32 and the second slot antenna 34, resulting in four bottom plate conductive elements 30 are utilized to form the side conductors of the first slot antenna 32 and the second slot antenna 34.

In this exemplary embodiment, the electronic signal receiver is the location determining element 22, which is electrically connected to the structure of the first slot antenna 32 and the second slot antenna 34 through the one or more signal traces of the printed circuit board 26 and the first signal feed bottom plate conductive element 50A, which provides a signal feed path for the first location electronic signal, and the second signal feed bottom plate conductive element 50B, which provides a signal feed path for the second location electronic signal. Through the first signal feed bottom plate conductive element 50A and various signal traces or conductive planes on the printed circuit board 26, the first location electronic signal is electronically communicated between the first slot antenna 32 and the location determining element 22. Similarly, through the second signal feed bottom plate conductive element 50B and various signal traces or conductive planes on the printed circuit board 26, the second location electronic signal is electronically communicated between the second slot antenna 34 and the location determining element 22. The first and second portions of the bottom plate 40 and the printed circuit board 26 that are associated with the first slot antenna 32 and the second slot antenna 34, respectively, are shown in crosshatch in FIGS. 14A and 14B. This utilization of the various components of the electronic device 10 to form the structures of the first slot antenna 32 and the second slot antenna 34 allows for two slot antennas to be positioned in the lower portion and a lower horizontal plane of housing 12, as shown in FIG. 12B. As discussed above, in embodiments, a tuning network 52 may be incorporated to extend or reduce the effective length of an aperture associated with the first slot antenna 32 and/or second slot antenna 34, as needed, in view of the circumference of the housing 12, the circumference of the printed circuit board 26 and the height of the plurality of bottom plate conductive elements 30. It is to be understood that, in some embodiments, the second slot antenna 34 may instead be utilized to transmit and receive wireless communication signals utilizing Bluetooth™ and/or Wi-Fi having frequencies of approximately 2.4 GHz and frequencies commonly associated with cellular protocols. In such embodiments, the second slot antenna 34 is communicatively coupled with the communication element 24.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A wrist-worn electronic device comprising:

a housing including a circumferential side wall, a bezel coupled to an upper surface of the side wall, and a bottom plate coupled to a lower surface of the side wall, the bezel and the bottom plate each formed from electrically conductive material;

a printed circuit board positioned within the housing between the bezel and the bottom plate, the printed circuit board at least partially forming a ground plane;

a first slot antenna configured to transmit a first wireless signal, receive the first wireless signal, or both, the first wireless signal having a first frequency, the first slot antenna formed in part by:

a first portion of a circumference of the bezel, and the ground plane of the printed circuit board; and a second slot antenna configured to transmit a second wireless signal, receive the second wireless signal, or both, the second wireless signal having a second frequency, the second slot antenna formed in part by:

a first portion of a circumference of the bottom plate, and the ground plane of the printed circuit board.

2. The wrist-worn electronic device of claim 1, further comprising:

a plurality of bezel conductive elements, each of the plurality of bezel conductive elements providing an electrical connection from the printed circuit board to the bezel;

wherein the first slot antenna is further formed by:

a first bezel conductive element of the plurality of bezel conductive elements positioned at a first end of the first portion of the circumference of the bezel, a second bezel conductive element of the plurality of bezel conductive elements positioned at a second end of the first portion of the circumference of the bezel, and the first portion of the circumference of the bezel extending between the first end and the second end of the first portion of the circumference of the bezel.

3. The wrist-worn electronic device of claim 1, further comprising:

a plurality of bottom plate conductive elements, each of the plurality of bottom plate conductive elements providing an electrical connection from the printed circuit board to the bottom plate; and the second slot antenna is further formed by:

a first bottom plate conductive element of the plurality of bottom plate conductive elements positioned at a first end of the first portion of the circumference of the bottom plate, a second bottom plate conductive element of the plurality of bottom plate conductive elements positioned at a second end of the first portion of the circumference of the bottom plate, and the first portion of the circumference of the bottom plate extending between the first end and the second end of the first portion of the circumference of the bottom plate.

4. The wrist-worn electronic device of claim 1, wherein the first slot antenna is configured as a first global navigation satellite system (GNSS) antenna configured to wirelessly receive a first location wireless signal, the first location wireless signal corresponding to the first wireless signal.

5. The wrist-worn electronic device of claim 4, further comprising a location determining element, wherein the first slot antenna is further configured to electronically communicate a first location electronic signal to the location determining element, the first location electronic signal corresponding to the first location wireless signal, and wherein the location determining element is configured to determine a current geolocation of the electronic device based on the first location electronic signal.

6. The wrist-worn electronic device of claim 1, wherein the second slot antenna is configured as a communication antenna configured to wirelessly receive and transmit a communication wireless signal, the communication wireless signal corresponding to the second wireless signal.

7. The wrist-worn electronic device of claim 6, further comprising a communication element, wherein the second slot antenna is further configured to electronically communicate a communication electronic signal to the communication element or transmit a communication electronic signal output by the communication element, the communication electronic signal corresponding to the communication wireless signal.

8. The wrist-worn electronic device of claim 2, further comprising:

a third slot antenna configured to transmit a third wireless signal, receive the third wireless signal, or both, the third wireless signal having a third frequency, the third slot antenna formed in part by:

a second portion of a circumference of the bezel, and the ground plane of the printed circuit board; and a third bezel conductive element of the plurality of bezel conductive elements providing an electrical connection from the printed circuit board to the bezel and positioned at a first end of the second portion of the circumference of the bezel;

wherein the first bezel conductive element is positioned at a second end of the second portion of the circumference of the bezel; and wherein the second portion of the circumference of the bezel extends between the first end and the second end of the second portion of the circumference of the bezel.

9. The wrist-worn electronic device of claim 8, wherein the first slot antenna is configured as a first global navigation satellite system (GNSS) antenna configured to wirelessly receive a first location wireless signal, the first location wireless signal corresponding to the first wireless signal, and wherein the third slot antenna is configured as a second GNSS antenna configured to wirelessly receive a second location wireless signal, the second location wireless signal corresponding to the third wireless signal.

10. The wrist-worn electronic device of claim 9, further comprising a location determining element, wherein the first slot antenna is further configured to electronically communicate a first location electronic signal to the location determining element and the third slot antenna is further configured to electronically communicate the second location electronic signal to the location determining element, the first location electronic signal corresponding to the first location wireless signal and the second location electronic signal corresponding to the second location wireless signal, and wherein the location determining element is configured to determine a current geolocation of the electronic device based on the first location electronic signal and the second location electronic signal.

11. The wrist-worn electronic device of claim 10, wherein the first wireless signal corresponds to the GPS L1 band with a center frequency of approximately 1575.42 MHz, and wherein the third wireless signal corresponds to the GPS L5 band with a center frequency of approximately 1176.45 megahertz (MHz).

12. A wrist-worn electronic device comprising:

a housing including a circumferential side wall, a bezel coupled to an upper surface of the side wall, and a bottom plate coupled to a lower surface of the side wall, the bezel and the bottom plate each formed from electrically conductive material;

a printed circuit board positioned within the housing between the bezel and the bottom plate, the printed circuit board at least partially forming a ground plane;

a plurality of bezel conductive elements, each of the plurality of bezel conductive elements providing an electrical connection from the printed circuit board to the bezel;

a plurality of bottom plate conductive elements, each of the plurality of bottom plate conductive elements providing an electrical connection from the printed circuit board to the bottom plate;

a first slot antenna configured to transmit a first wireless signal, receive the first wireless signal, or both, the first wireless signal having a first frequency, the first slot antenna formed in part by:

a first bezel conductive element of the plurality of bezel conductive elements positioned at a first end of a first portion of the circumference of the bezel, a second bezel conductive element of the plurality of bezel conductive elements positioned at a second end of the first portion of the circumference of the bezel, the first portion of a circumference of the bezel extending between the first end and the second end of the first portion of the circumference of the bezel, and the ground plane of the printed circuit board; and a second slot antenna configured to transmit a second wireless signal, receive the second wireless signal, or both, the second wireless signal having a second frequency, the second slot antenna formed in part by:

a first bottom plate conductive element of the plurality of bottom plate conductive elements positioned at a first end of a first portion of the circumference of the bottom plate, a second bottom plate conductive element of the plurality of bottom plate conductive elements positioned at a second end of the first portion of the circumference of the bottom plate, the first portion of a circumference of the bottom plate extending between the first end and the second end of the first portion of the circumference of the bottom plate, and the ground plane of the printed circuit board.

13. The wrist-worn electronic device of claim 12, further comprising a location determining element, wherein the first slot antenna is configured as a first global navigation satellite system (GNSS) antenna configured to wirelessly receive a first location wireless signal and electronically communicate a first location electronic signal to the location determining element, the first location electronic signal corresponding to the first location wireless signal, and wherein the location determining element is configured to determine a current geolocation of the electronic device based on the first location electronic signal.

14. The wrist-worn electronic device of claim 12, further comprising a communication element, wherein the second slot antenna is configured as a communication antenna configured to wirelessly receive and transmit a communication wireless signal and electronically communicate a communication electronic signal to the communication element, the communication electronic signal corresponding to the communication wireless signal.

15. The wrist-worn electronic device of claim 12, further comprising:

a third slot antenna configured to transmit a third wireless signal, receive the third wireless signal, or both, the third wireless signal having a third frequency, the third slot antenna formed in part by:

a second portion of a circumference of the bezel, and the ground plane of the printed circuit board; and a third bezel conductive element of the plurality of bezel conductive elements providing an electrical connection from the printed circuit board to the bezel and positioned at a first end of the second portion of the circumference of the bezel;

wherein the first bezel conductive element is positioned at a second end of the second portion of the circumference of the bezel;

wherein the third slot antenna is configured as a second GNSS antenna configured to wirelessly receive a second location wireless signal and electronically communicate a second location electronic signal to the location determining element, the second location electronic signal corresponding to the second location wireless signal; and wherein the location determining element is configured to determine a current geolocation of the electronic device based on the first location electronic signal and the second location electronic signal.

16. A wrist-worn electronic device comprising:

a housing including a circumferential side wall, a bezel coupled to an upper surface of the side wall, and a bottom plate coupled to a lower surface of the side wall, the bezel and the bottom plate each formed from electrically conductive material;

a printed circuit board positioned within the housing between the bezel and the bottom plate, the printed circuit board at least partially forming a ground plane;

a first global navigation satellite system (GNSS) antenna configured to wirelessly receive a first location wireless signal, the first location wireless signal having a first frequency, the first GNSS antenna formed in part by:

a first portion of a circumference of the bezel, and the ground plane of the printed circuit board;

a location determining element configured to determine a current geolocation of the electronic device based on a first location electronic signal corresponding to the first location wireless signal;

a communication antenna configured to transmit and receive a communication wireless signal, the communication wireless signal having a second frequency, the communication antenna formed in part by:

a first portion of a circumference of the bottom plate, and the ground plane of the printed circuit board; and a communication element configured to receive and output communication wireless signals corresponding to the communication wireless signal.

17. The wrist-worn electronic device of claim 16, further comprising:

a plurality of bezel conductive elements, each of the plurality of bezel conductive elements providing an electrical connection from the printed circuit board to the bezel; and the first GNSS antenna is further formed by:

a first bezel conductive element of the plurality of bezel conductive elements positioned at a first end of the first portion of the circumference of the bezel, and a second bezel conductive element of the plurality of bezel conductive elements positioned at a second end of the first portion of the circumference of the bezel, and the first portion of the circumference of the bezel extending between the first end and the second end of the first portion of the circumference of the bezel.

18. The wrist-worn electronic device of claim 17, further comprising:

a second GNSS antenna configured to receive a second location wireless signal, the second location wireless signal having a second frequency, the second GNSS antenna formed by:

a third bezel conductive element of the plurality of bezel conductive elements positioned at a first end of the second portion of the circumference of the bezel, a fourth bezel conductive element of the plurality of bezel conductive elements positioned at a second end of the second portion of the circumference of the bezel, and a second portion of the circumference of the bezel extending between the first end and the second end of the second portion of the circumference of the bezel.

19. The wrist-worn electronic device of claim 17, wherein the second GNSS antenna electronically communicates a second location electronic signal to the location determining element, the second location electronic signal corresponding to the second location wireless signal.

20. The wrist-worn electronic device of claim 16, further comprising:

a plurality of bottom plate conductive elements, each of the plurality of bottom plate conductive elements providing an electrical connection from the printed circuit board to the bottom plate; and the communication antenna is further formed by:

a first bottom plate conductive element of the plurality of bottom plate conductive elements positioned at a first end of the first portion of the circumference of the bottom plate, a second bottom plate conductive element of the plurality of bottom plate conductive elements positioned at a second end of the first portion of the circumference of the bottom plate, and the first portion of the circumference of the bottom plate extending between the first end and the second end of the first portion of the circumference of the bottom plate.

* * * * *